(12) United States Patent
Hashizume

(10) Patent No.: US 12,447,671 B2
(45) Date of Patent: Oct. 21, 2025

(54) THREE-DIMENSIONAL SHAPING METHOD

(71) Applicant: SEIKO EPSON CORPORATION, Tokyo (JP)

(72) Inventor: Keitaro Hashizume, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 294 days.

(21) Appl. No.: 18/350,670

(22) Filed: Jul. 11, 2023

(65) Prior Publication Data

US 2024/0017480 A1    Jan. 18, 2024

(30) Foreign Application Priority Data

Jul. 13, 2022    (JP) .................................. 2022-112322

(51) Int. Cl.
    *B33Y 10/00*    (2015.01)
    *B29C 64/141*    (2017.01)

(52) U.S. Cl.
    CPC ............ *B29C 64/141* (2017.08); *B33Y 10/00* (2014.12); *B29K 2995/0012* (2013.01); *B29K 2995/0049* (2013.01); *B29K 2995/0077* (2013.01)

(58) Field of Classification Search
    None
    See application file for complete search history.

(56) References Cited

U.S. PATENT DOCUMENTS

| 2014/0121813 A1* | 5/2014 | Schmehl | ............... | B33Y 70/00 700/119 |
| 2023/0182385 A1* | 6/2023 | Black | .................. | B29C 64/165 419/6 |

FOREIGN PATENT DOCUMENTS

JP    2021 172 084 A    * 11/2021

* cited by examiner

*Primary Examiner* — Mohammad M Ameen
(74) *Attorney, Agent, or Firm* — WORKMAN NYDEGGER

(57) ABSTRACT

A three-dimensional shaping method of shaping a three-dimensional shaped article using a first material including first resin and a second material including second resin having a heat shrinkage rate different from a heat shrinkage rate which the first resin has, the method including stacking, when preparing a first slice layer formed of one of the first material and the second material, and stacking a second slice layer formed of another of the first material and the second material on the first slice layer, a first boundary layer formed of the one of the first material and the second material on the first slice layer, staking a second boundary layer formed of the another of the first material and the second material on the first boundary layer, and stacking the second slice layer on the second boundary layer, wherein the first boundary layer is a layer provided with a plurality of voids formed inside a contour of the first boundary layer when viewing the first boundary layer from a stacking direction of the first slice layer and the second slice layer.

10 Claims, 14 Drawing Sheets

THREE-DIMENSIONAL SHAPING METHOD

The present application is based on, and claims priority from JP Application Serial Number 2022-112322, filed Jul. 13, 2022, the disclosure of which is hereby incorporated by reference herein in its entirety.

BACKGROUND

1. Technical Field

The present disclosure relates to a three-dimensional shaping method.

2. Related Art

There has been conducted research and development on a three-dimensional shaping device for stacking a molding material at least partially melted to shape a three-dimensional shaped article.

Regarding the above, as a three-dimensional shaping method of stacking a molding material high in heat shrinkage rate such as POM (Polyoxymethylene) on a stage to shape a three-dimensional shaped article, there has been known a three-dimensional shaping method of controlling at least one of the temperature of the stage and the ambient temperature when stacking the molding material on the stage to thereby prevent the molding material thus stacked from separating from the stage (see JP-A-2021-172084 (Document 1)).

However, in the three-dimensional shaping method described in Document 1, when stacking a plurality of molding materials different in heat shrinkage rate on the stage to shape the three-dimensional shaped article, it is difficult in some cases to prevent delamination from occurring in an boundary between a layer formed of the molding material higher in heat shrinkage rate out of the plurality of molding materials and a layer formed of the molding material lower in heat shrinkage rate out of the plurality of molding materials.

SUMMARY

In view of the problem described above, an aspect of the present disclosure is a three-dimensional shaping method of shaping a three-dimensional shaped article using a first material including first resin and a second material including second resin having a heat shrinkage rate different from a heat shrinkage rate which the first resin has, the method including stacking, when preparing a first slice layer formed of one of the first material and the second material, and stacking a second slice layer formed of another of the first material and the second material on the first slice layer, a first boundary layer formed of the one of the first material and the second material on the first slice layer, staking a second boundary layer formed of the another of the first material and the second material on the first boundary layer, and stacking the second slice layer on the second boundary layer, wherein the first boundary layer is a layer provided with a plurality of voids formed inside a contour of the first boundary layer when viewing the first boundary layer from a stacking direction of the first slice layer and the second slice layer.

DESCRIPTION OF AN EXEMPLARY EMBODIMENT

Embodiment

An embodiment of the present disclosure will hereinafter be described with reference to the drawings.

Outline of Three-Dimensional Shaping Device

First, a three-dimensional shaping device according to the embodiment will be described.

The three-dimensional shaping device according to the embodiment shapes a three-dimensional shaped article using a first material and a second material. The first material includes first resin. The second material includes second resin having a heat shrinkage rate different from the heat shrinkage rate provided to the first resin. Further, the three-dimensional shaping device is provided with a stage, an ejection unit, a moving unit, and a controller. The ejection unit ejects each of the first material and the second material. The moving unit moves the ejection unit and the stage relatively to each other. The controller controls the ejection unit and the moving unit. Further, when providing a first slice layer formed of one of the first material and the second material, and stacking a second slice layer formed of the other of the first material and the second material on the first slice layer, the controller stacks a first boundary layer formed of the one of the materials on the first slice layer, stacks a second boundary layer formed of the other of the materials on the first boundary layer, and stacks the second slice layer on the second boundary layer. Further, the first boundary layer is a layer provided with a plurality of voids formed inside a contour of the first boundary layer when viewing the first boundary layer from a stacking direction of the first slice layer and the second slice layer. Thus, it is possible for the three-dimensional shaping device to prevent delamination from occurring in a boundary between the first slice layer and the second slice layer formed of the respective materials different in heat shrinkage rate from each other.

A configuration of the three-dimensional shaping device according to the embodiment, a configuration of a control device provided to the three-dimensional shaping device, and processing performed by the control device will hereinafter be described in detail.

Configuration of Three-Dimensional Shaping Device

The configuration of the three-dimensional shaping device according to the embodiment will hereinafter be described citing a three-dimensional shaping device 1 as an example.

Figure 1:
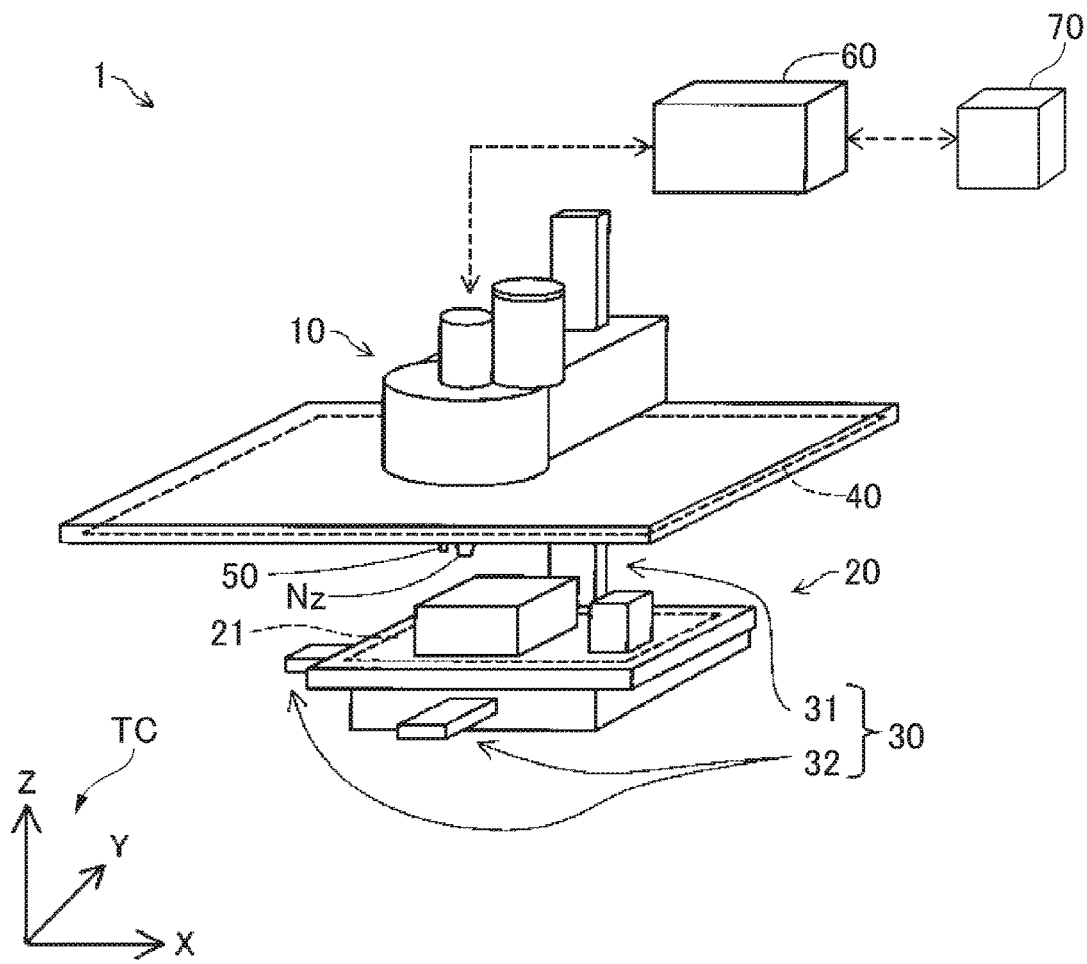
FIG. 1 is a diagram showing an example of a configuration of a three-dimensional shaping device.

FIG. 1 is a diagram showing an example of the configuration of the three-dimensional shaping device 1.

Here, a three-dimensional coordinate system TC is a three-dimensional orthogonal coordinate system representing directions in a diagram in which the three-dimensional coordinate system TC is drawn. The description will hereinafter be presented referring to an X axis in the three-dimensional coordinate system TC simply as an X axis for the sake of convenience of description. Further, the description will hereinafter be presented referring to a Y axis in the three-dimensional coordinate system TC simply as a Y axis for the sake of convenience of description. Further, the description will hereinafter be presented referring to a Z axis in the three-dimensional coordinate system TC simply as a Z axis for the sake of convenience of description. Further, there will hereinafter be described when a negative direction in the Z axis coincides with a gravitational direction as an example. Therefore, for the sake of convenience of explanation, the description will hereinafter be presented referring to a positive direction in the Z axis as an upward direction or simply "above," and referring to a negative direction in the Z axis as a downward direction or simply "below."

The three-dimensional shaping device 1 is provided with an ejection unit 10 having a nozzle Nz, a stage 20 having a shaping surface 21 on which a three-dimensional shaped article is shaped, a moving unit 30, a heater 40, a temperature detector 50, a control device 60, and a data generation device 70. It should be noted that in the three-dimensional shaping device 1, the control device 60 can be configured integrally with the data generation device 70. Further, the three-dimensional shaping device 1 can be provided with a configuration in which the data generation device 70 is not provided. In this case, the data generation device 70 is externally connected to the control device 60 of the three-dimensional shaping device 1 so as to be able to communicate with each other. Further, the three-dimensional shaping device 1 can be provided with a configuration in which the control device 60 and the data generation device 70 are not provided. In this case, the control device 60 is externally connected to the three-dimensional shaping device 1 so as to be able to communicate with each other. Further, in this case, the data generation device 70 is externally connected to the control device 60 so as to be able to communicate with each other.

The three-dimensional shaping device 1 changes a relative position between the ejection unit 10 and the stage while ejecting a molding material X not shown from the ejection unit 10 toward the shaping surface 21 of the stage Thus, the three-dimensional shaping device 1 stacks N slice layers L to shape a single three-dimensional shaped article having a predetermined shape. Here, any integers no smaller than 1 can be adopted as N. In this case, a first slice layer L counted from below out of the N slice layers L is stacked on the shaping surface 21. Further, each of the N slice layers L stacked on the shaping surface 21 means the molding material X ejected along a shaping path parallel to the shaping surface 21. Further, the shaping path means a scanning path of the nozzle Nz, which moves while ejecting the molding material X, with respect to the stage 20. In other words, the three-dimensional shaping device 1 ejects the molding material X with the ejection unit 10 along the shaping path of the n-th slice layer L out of the N slice layers L to thereby stack the n-th slice layer L on the (n−1)-th slice layer L. It should be noted that n is one of integers no smaller than 1 and no larger than N. Further, each of the N slice layers L can be constituted by a single layer, or can also be constituted by a plurality of layers stacked on one another. Here, the shaping paths of a certain slice layer L include an outline path as the scanning path of the nozzle Nz along a contour of that slice layer L, and an infill path as the scanning path of the nozzle Nz in an area surrounded by the outline path. In other words, a certain slice layer L is constituted by the molding material X ejected along the outline path of that slice layer L and the molding material X ejected along the infill path of that slice layer L.

Further, it is possible for the three-dimensional shaping device 1 to selectively eject two types of materials, namely a first material and a second material different in heat shrinkage rate from each other, from the nozzle Nz as the molding material X. Thus, it is possible for the three-dimensional shaping device 1 to shape the three-dimensional shaped article shaped with these two types of materials. Here, the first material means a material including first resin. Further, the second material means a material including second resin having a heat shrinkage rate different from the heat shrinkage rate provided to the first resin. Hereinafter, as an example, there will be described when the heat shrinkage rate provided to the second material is higher than the heat shrinkage rate provided to the first material. In this case, the first resin is, for example, ABS (Acrylonitrile Butadiene Styrene). Further, in this case, the second resin is, for example, POM (Polyoxymethylene). It should be noted that instead of ABS, the first resin can be resin of other types having the heat shrinkage rate lower than the heat shrinkage rate provided to the second resin. Further, instead of POM, the second resin can be resin of other types having the heat shrinkage rate higher than the heat shrinkage rate provided to the first resin, and can be, for example, crystalline resin such as PA12 (polyamide 12), PBT (polybutylene terephthalate), PSU (polysulfone), PA66 (polyamide 66), PET (polyethylene terephthalate), LCP (liquid crystal polymer), PEEK (polyether ether ketone), PSF (polysulfone), PA6 (polyamide 6), or PPS (polyphenylene sulfide).

The three-dimensional shaping device 1 performs shaping control of shaping such a three-dimensional shaped article based on three-dimensional shaping data. Here, the three-dimensional shaping device 1 generates the three-dimensional shaping data in accordance with an operation received. The three-dimensional shaping data is data for making the three-dimensional shaping device 1 stack the N slice layers L as the three-dimensional shaped article having a predetermined shape. In the three-dimensional shaping device 1, there is stored shape data representing that shape. The shape data can be any data as long as the data represents that shape, and is, for example, STL (Stereolithography) data. Based on the operation thus received and the shape data, the three-dimensional shaping device 1 generates object data representing an imaginary object including at least an imaginary shaped body having the shape represented by the shape data out of the shaped body and an imaginary support body to be attached to the shaped body for supporting the shaped body. The shaped body means a portion to be separated from the N slice layers L stacked on one another as a single three-dimensional shaped article in a portion included in the N slice layers L. Further, the support body means a portion of supporting the shaped body in the portion included in the N slice layers L stacked on one another.

After generating the object data, the three-dimensional shaping device 1 stores the object data thus generated. After storing the object data, the three-dimensional shaping device 1 virtually slices the object into N slice layers VL based on slice condition information. The N slice layers VL obtained by the three-dimensional shaping device 1 virtually slicing the object in such a manner correspond respectively to the N slice layers L described above. Therefore, for the sake of convenience of explanation, the description will hereinafter be presented referring to an n-th slice layer VL out of these N slice layers VL as a slice layer VLn, and referring to an n-th slice layer L out of the N slice layers L described above as a slice layer Ln. In this case, for example, a first slice layer VL1 corresponds to a first slice layer L1. Here, the slice condition information means information representing a slice condition for virtually slicing the object represented by the object data stored in the three-dimensional shaping device 1 into the N slice layers VL. The slice condition information includes information such as information representing the number of the N slice layers VL, and information representing thicknesses of the respective N slice layers VL as the information representing the slice condition.

After virtually slicing the object, the three-dimensional shaping device 1 generates the shaping paths of the slice layer VL for each of the N slice layers VL thus sliced based on shaping path generation condition information. The shaping path means the scanning path of the nozzle Nz, which moves while ejecting the molding material X, with respect to the stage 20 as described above. Therefore, the molding material X ejected along the shaping paths of the n-th slice layer VLn means an actual slice layer Ln corresponding to the slice layer VLn.

Here, the n-th slice layer VLn is one of the slice layers obtained by slicing at least one of the shaped body and the support body included in the object. Therefore, in the n-th slice layer VLn, there are included at least one of a portion obtained by slicing the shaped body and a portion obtained by slicing the support body. In other words, the n-th slice layer VLn includes at least one of a layer obtained by slicing the shaped body and a layer obtained by slicing the support body. Further, the layer obtained by slicing the shaped body is classified into two types, namely a first solid layer and a shaped layer. The first solid layer means a solid layer of the shaped body. The shaped body is constituted by the first solid layers, and the shaped layer stacked between the first solid layer and the first solid layer. In other words, the shaped body is shaped by stacking the first solid layers and the shaped layer on one another. Further, the layers obtained by slicing the support body are classified into three types, namely a second solid layer, a support layer, and a raft layer. The second solid layer means a solid layer of the support body. The raft layer means a layer to be a base on which each of the first solid layer, the shaped layer, the second solid layer, and the support layer is stacked. The support body is constituted by the second solid layers, the support layer stacked between the second solid layer and the second solid layer, and the raft layer. In other words, the support body is shaped by stacking the second solid layers, the support layer, and the raft layer on one another. For example, when a shape of a certain shaped body is a shape having an overhang, an overhang portion in a portion provided to the shaped body is supported by such a support body. According to the above, the type of the n-th slice layer VLn is classified by a layer included in the n-th slice layer VLn. For example, when the n-th slice layer VLn includes only the first solid layer, the type of the n-th slice layer VLn is the first solid layer. Further, for example, when the n-th slice layer VLn includes the first solid layer and the second solid layer, the type of the n-th slice layer VLn is represented by a combination of the type of the layer obtained by slicing the shaped body out of the layers included in the n-th slice layer VLn and the type of the layer obtained by slicing the support body out of the layers included in the n-th slice layer VLn, namely a combination of the first solid layer and the second solid layer. Further, the type of the n-th slice layer VLn is also the type of the n-th slice layer Ln. Therefore, it is possible for the three-dimensional shaping device 1 to identify the type of the n-th slice layer VLn based on the slice condition information, and at the same time, it is possible for the three-dimensional shaping device 1 to identify the type of the slice layer Ln.

After generating the shaping path of each of the N slice layers VL, the three-dimensional shaping device 1 generates the three-dimensional shaping data including shaping path information representing the shaping path of each of the N slice layers VL thus generated. Here, the shaping path generation condition information means information representing the shaping path condition for generating the shaping path of each of the N slice layers VL. In the shaping path generation condition information, there is included information such as information representing the shapes of the shaping paths of the respective types in each of the N slice layers VL, information representing widths of the shaping paths of the respective types in each of the N slice layers VL, information representing thicknesses of the shaping paths of the respective types in each of the N slice layers VL, information representing moving speed of the nozzle Nz when ejecting the molding material X along the shaping paths of the respective types in each of the N slice layers VL, and information representing the type of the molding material X to be ejected from the nozzle Nz, as the information representing the shaping path generation condition. Further, in the shaping path information representing a certain shaping path, there is included other information such as information representing the width of that shaping path, information representing the thickness of that shaping path, and information representing the moving speed of the nozzle Nz when ejecting the molding material X along that shaping path.

It should be noted that in the three-dimensional shaping device 1, the slice condition information described above can include, or is not required to include, (n−1)-th slice layer type information representing the type of the (n−1)-th slice layer VLn−1 out of the N slice layers VL, and n-th slice layer type information representing the type of the n-th slice layer VLn to be stacked on the (n−1)-th slice layer VLn−1 out of the N slice layers VL.

Here, the slice layer L as the raft layer out of the N slice layers L means a layer formed between the shaping surface 21 as the base of the slice layers L as another layer and the another layer, and means a layer filled with the molding material X. The another layer means each of the slice layers L stacked on the raft layer out of the N slice layers L, and specifically means the slice layer L of some or all of the first solid layer, the shaped layer, the second solid layer, and the support layer. When the another layer is stacked on the shaping surface 21 so as to have contact with the shaping surface 21, the another layer becomes difficult to separate from the shaping surface 21 in some cases. Further, in that case, it is unachievable to accurately fix the another layer in some cases. Further, in that case, a residual stress remains in the another layer in some cases. The layer stacked between the another layer and the shaping surface 21 in order to resolve these problems is the slice layer L as the raft layer. Further, the slice layer L as each of the solid layer, the shaped layer, and the support layer is formed of the outline as the molding material X ejected along a contour of a predetermined outer shape, and the infill as the molding material X ejected in an area surrounded by the outline. In other words, the slice layer L as each of the solid layer, the shaped layer, and the support layer is formed of the outline as the molding material X ejected along the outline path described above, and the infill as the molding material X ejected along the infill path described above. Further, the slice layer L as the solid layer means a layer obtained by filling the area surrounded by the outline of the slice layer L as the solid layer with the infill with substantially no space. In other words, the slice layer L as the solid layer means a layer in which a filling rate with the infill in that area is 100%. It should be noted that the slice layer L as the first solid layer can be reworded as one or more layers including the molding material X forming a surface of the shaped body. Further, the slice layer L as the shaped layer means one or more layers including the molding material X forming an inside of the shaped body. Further, the slice layer L as the second solid layer can be reworded as one or more layers including the molding material X forming a surface of the support body. In contrast, the slice layer L as the shaped layer means a layer in which the infill is included in the area surrounded by the outline of the shaped layer, and in which an area not filled with the infill exists in that area. In other words, the slice layer L as the shaped layer means a layer in which the filling rate with the infill in that area is lower than 100%. Further, the slice layer L as the shaped layer can be reworded as one or more layers including the molding material X forming the inside of the shaped body. Further, the slice layer L as the support layer means a layer in which the infill is included in the area surrounded by the outline of the support layer, and in which an area not filled with the infill exists in that area. In other words, the slice layer L as the support layer means a layer in which the filling rate with the infill in that area is lower than 100%. Further, the slice layer Ln as the support layer can be reworded as one or more layers including the molding material X forming the inside of the support body.

The three-dimensional shaping device 1 performs shaping control of shaping the three-dimensional shaped article based on the three-dimensional shaping data generated in such a manner as described above. Further, when the three-dimensional shaping device 1 stacks N slice layers L on the shaping surface 21 in the shaping control, the three-dimensional shaping device 1 ejects each of the N slice layers L with the ejection unit 10 on the shaping surface 21 as the slice layers L of the type represented by some or all of the raft layer, the first solid layer, the shaped layer, the second solid layer, and the support layer to thereby stack the N slice layers L to shape a single three-dimensional shaped article.

Here, when stacking the slice layer L formed of the first material and the slice layer L formed of the second material on one another, the delamination occurs in some cases on the boundary between these two slice layers due to a difference between the heat shrinkage rate provided to the first material and the heat shrinkage rate provided to the second material.

Therefore, when the three-dimensional shaping device 1 stacks the second slice layer on the first slice layer in the shaping control of shaping the three-dimensional shaped article, the three-dimensional shaping device 1 stacks the first boundary layer formed of the first material on the first slice layer, then stacks the second boundary layer formed of the second material on the first boundary layer, and then stacks the second slice layer on the second boundary layer. Here, the boundary layers mean the two slice layers L located so as to sandwich the boundary between the slice layer L formed of the first material out of the N slice layers stacked by the three-dimensional shaping device 1 on the shaping surface 21, and the slice layer L formed of the second material out of the N slice layers stacked by the three-dimensional shaping device 1 on the shaping surface 21. Further, the first boundary layer means the boundary layer formed of the first material, and means the boundary layer in which a plurality of voids is formed inside the contour when viewed from the stacking direction of the first slice layer and the second slice layer. Further, the second boundary layer means the boundary layer formed of the second material, and means the boundary layer partially infiltrating into the plurality of voids provided to the first boundary layer. Further, the first slice layer means each of all of the slice layers L other than the first boundary layer out of the slice layers L formed of the first material. Further, the second slice layer means each of all of the slice layers L other than the second boundary layer out of the slice layers L formed of the second material.

As described above, it is possible for the three-dimensional shaping device 1 to prevent the delamination from occurring in the boundary between the first slice layer and the second slice layer by stacking the first slice layer, the first boundary layer, the second boundary layer, and the second slice layer in this order so as to sandwich the first boundary layer and the second boundary layer with the first slice layer and the second slice layer. This is realized by a combination of three requirements, namely a requirement that the first slice layer and the first boundary layer have the same heat shrinkage rate, a requirement that the second slice layer and the second boundary layer have the same heat shrinkage rate, and a requirement that a part of the second boundary layer infiltrates into the plurality of voids provided to the first boundary layer. Here, when a part of the second boundary layer infiltrates into the plurality of voids provided to the first boundary layer, the second boundary layer engages with the first boundary layer. Thus, it results in that the first boundary layer bears a compressive stress of warping the second boundary layer due to a decrease in temperature. As a result, the warpage of the second boundary layer is prevented from occurring, and it becomes difficult for the second boundary layer to separate from the first boundary layer. Due to such a stacking procedure method of the slice layers L as described above, it is possible for the three-dimensional shaping device 1 to prevent the delamination from occurring in the boundary between the first slice layer and the second slice layer formed of the respective materials different in heat shrinkage rate from each other. It should be noted that when making a part of the second boundary layer infiltrate into the first boundary layer as described above, interlayer adhesiveness between the second boundary layer and the first boundary layer becomes higher compared to when stacking the second boundary layer on the first boundary layer after forming the first boundary layer with each of the first material and the second material. The reason is that when stacking the second boundary layer on the first boundary layer after forming the first boundary layer with each of the first material and the second material, a layer interface is formed between the second material in the first boundary layer and the second material in the second boundary layer. In contrast, when making a part of the second boundary layer infiltrate into the voids of the first boundary layer, the layer interface is not formed between the second material infiltrating into the first boundary layer and the second material in the second boundary layer. Therefore, the processing of making a part of the second boundary layer infiltrate into the voids of the first boundary layer and the processing of stacking the second boundary layer on the first boundary layer after forming the first boundary layer with each of the first material and the second material are essentially different from each other. It should be noted that a heat shrinkage volume of the second boundary layer in the shaping process is preferably no higher than 60% of a heat shrinkage volume of the second boundary layer after completion of the shaping process. Thus, it is possible to prevent the shaping accuracy from decreasing due to a change in shape of the shaped layer in the shaping process.

The ejection unit 10 is an ejection device of selectively ejecting each of the first material and the second material as the molding material X on the shaping surface 21. More specifically, the ejection unit 10 has a first material melting unit which melts one or more types of material to make the first material, a second material melting unit which melts one or more types of material to make the second material, a material supply switching unit, a first material feeder, and a second material feeder together with the nozzle Nz described above. Here, in the ejection unit 10, the first material feeder and the first material melting unit are connected with a first supply path. Further, in the ejection unit 10, the second material feeder and the second material melting unit are connected with a second supply path. Further, the first material melting unit and the material supply switching unit are connected with a third supply path. Further, the second material melting unit and the material supply switching unit are connected with a fourth supply path. Further, the material supply switching unit and the nozzle Nz are connected with a communication hole. It should be noted that the material supply switching unit switches the material to be supplied as the molding material X to the nozzle Nz via the communication hole between the first material supplied from the first material melting unit and the second material supplied from the second material melting unit. The nozzle Nz ejects the molding material X, which is supplied from the material supply switching unit through the communication hole, from a tip. It should be noted that the ejection unit 10 can be provided with a configuration in which two nozzles, namely a first nozzle for ejecting the first material and a second nozzle for ejecting the second material, are provided instead of the nozzle Nz. In this case, the ejection unit 10 does not have the material supply switching unit. Further, in this case, the first material melting unit is connected to the first nozzle via a first communication hole. Further, in this case, the second material melting unit is connected to the second nozzle via a second communication hole.

Here, when the three-dimensional shaping device 1 stacks the n-th slice layer Ln on the (n−1)-th slice layer Ln−1, the three-dimensional shaping device 1 changes a distance between an upper surface of the (n−1)-th slice layer Ln−1 and the tip of the nozzle Nz to thereby change at least one of the width of the molding material X to be ejected on the upper surface of the (n−1)-th slice layer Ln−1, and the thickness of the molding material X to be ejected on the upper surface of the (n−1)-th slice layer Ln−1. It should be noted that the maximum value of the width of the molding material X to be ejected on the upper surface of the n-th slice layer Ln by the three-dimensional shaping device 1 is an outer diameter of the tip of the nozzle Nz. This is because, when making the distance between the upper surface of the (n−1)-th slice layer Ln−1 and the tip of the nozzle Nz shorter than an inner diameter of the tip of the nozzle Nz, it results in that the molding material X ejected from the tip of the nozzle Nz is ejected on the upper surface of the (n−1)-th shaped layer while being flattened by the tip of the nozzle Nz.

In the first material feeder, there is housed one or more types of material in a state of a pellet, a powder, or the like as the material to be the first material. Hereinafter, as an example, there is described when the material housed in the first material feeder includes pelletized first resin. The first material feeder is formed of, for example, a hopper. The material housed in the first material feeder is fed to the first material melting unit via the first supply path disposed below the first material feeder.

In the second material feeder, there is housed one or more types of material in a state of a pellet, a powder, or the like as the material to be the second material. Hereinafter, as an example, there is described when the material housed in the second material feeder includes pelletized second resin. The second material feeder is formed of, for example, a hopper. The material housed in the second material feeder is fed to the second material melting unit via the second supply path disposed below the second material feeder.

The first material melting unit is provided with a screw case, a flat screw housed in the screw case, a drive motor for driving the flat screw, and a barrel fixed at a lower side of the flat screw in the screw case.

The flat screw is a screw which has a flat cylindrical shape, and which is provided with a spiral groove extending from an outer circumference of the cylinder toward the central axis of the cylinder formed on a bottom surface of the cylinder.

The barrel is provided with the third supply path. Further, the barrel incorporates a heater. The temperature of the heater is controlled by the control device 60.

The material supplied between the flat screw which is rotating and the barrel is at least partially melted due to the rotation of the flat screw and heating with the heater incorporated in the barrel, and thus, turns to the paste-like first material having fluidity. The paste-like first material is fed to the material supply switching unit via the third supply path provided to the barrel due to the rotation of the flat screw. When the state of the material supply switching unit is switched to a state of feeding the first material to the nozzle Nz, the first material fed to the material supply switching unit is fed to the nozzle Nz via the communication hole. Then, the first material fed to the nozzle Nz is ejected from the tip of the nozzle Nz toward the stage 20 as the molding material X.

The second material melting unit has substantially the same configuration as that of the first material melting unit. Therefore, the detailed description of the second material melting unit will hereinafter be omitted. The second material which is made paste-like in the second material melting unit is fed to the material supply switching unit via the fourth supply path provided to the barrel due to the rotation of the flat screw. When the state of the material supply switching unit is switched to a state of feeding the second material to the nozzle Nz, the second material fed to the material supply switching unit is fed to the nozzle Nz via the communication hole. Then, the second material fed to the nozzle Nz is ejected from the tip of the nozzle Nz toward the stage 20 as the molding material X.

The moving unit 30 changes the relative position between the nozzle Nz of the ejection unit 10 and the stage 20. More specifically, the moving unit 30 moves either one or both of the ejection unit 10 and the stage 20 to thereby change the relative position between the nozzle Nz of the ejection unit 10 and the stage 20. Hereinafter, as an example, there is described when the moving unit 30 moves the stage 20 to thereby change the relative position between the nozzle Nz of the ejection unit 10 and the stage 20. For example, the moving unit 30 is provided with a first moving mechanism unit 31 for moving the ejection unit 10 along the Z axis, and a second moving mechanism unit 32 for moving the stage 20 along the X axis and the Y axis relatively to the ejection unit 10. In the present embodiment, the first moving mechanism unit 31 shown in FIG. 1 is formed of a lifting device for moving the ejection unit 10 along the Z axis, and has a motor for moving the ejection unit 10 along the Z axis. The second moving mechanism unit 32 shown in FIG. 1 is formed of a horizontal carrying device for moving the stage 20 along the X axis and the Y axis, and has a motor for moving the stage 20 along the X axis and a motor for moving the stage 20 along the Y axis. The first moving mechanism unit 31 and the second moving mechanism unit 32 are controlled by the control device 60.

The heater 40 heats a target area including the molding material X ejected by the ejection unit 10. Here, the target area is an area including a whole of the N slice layers L when the N slice layers L are stacked on the shaping surface 21 as a single three-dimensional shaped article out of an area on the shaping surface 21. The heater 40 can have any configuration as long as the configuration is capable of heating the target area. In the example shown in FIG. 1, the heater 40 is a panel heater which is shaped like a flat plate, which has a surface opposed to the upper surface of the stage 20, namely the shaping surface 21, and which heats the target area. In this case, the heater 40 heats an area sandwiched between a lower surface provided to the heater 40 shaped like a flat plate and the shaping surface 21 as the target area. It should be noted that the heater 40 is controlled by the control device 60. Further, in the example shown in FIG. 1, the heater 40 is provided with a through hole through which the nozzle Nz described above is inserted. Therefore, the heater 40 is disposed on the periphery of the nozzle Nz, and operates together with the nozzle Nz. It should be noted that the heater 40 can be a heater of a chamber type of feeding hat air instead of the panel heater, or can be a cartridge heater, or can also be a heater of any other types capable of heating the inside of the target area. Further, the three-dimensional shaping device 1 can be provided with a configuration in which the heater 40 is not provided.

The temperature detector 50 is a temperature sensor for detecting the temperature of the upper surface of the slice layer L stacked on the shaping surface 21. In the example shown in FIG. 1, the temperature detector 50 is disposed on a lower surface of the heater 40. Further, the temperature detector 50 outputs information representing the temperature thus detected to the control device 60. Further, the three-dimensional shaping device 1 can be provided with a configuration in which the temperature detector 50 is not provided.

The control device 60 controls the whole of the three-dimensional shaping device 1. The control device 60 obtains the three-dimensional shaping data generated by the data generation device 70 via a network or a recording medium. The control device 60 performs the shaping control of controlling the operations of the ejection unit 10 and the moving unit 30 in accordance with the three-dimensional shaping data by executing a three-dimensional shaping program stored in advance to thereby shape the three-dimensional shaped article. It should be noted that it is also possible for the control device 60 to be formed of a combination of a plurality of circuits instead of a computer.

The shaping control described above means control related to the ejection unit 10 and the moving unit 30. More specifically, the shaping control means control of stacking the N slice layers L on the shaping surface 21 to shape the single three-dimensional shaped article having a predetermined shape. Here, the n-th slice layer Ln out of the N slice layers L is stacked on the (n−1)-th slice layer Ln−1. On this occasion, when the n-th slice layer Ln is stacked on the (n−1)-th slice layer Ln−1, a part of the (n−1)-th slice layer Ln−1 is melted due to the heat of the n-th slice layer Ln. Therefore, the n-th slice layer Ln is bonded to the (n−1)-th slice layer Ln−1. As a result, on the shaping surface 21, the N slice layers L are stacked on one another as the single three-dimensional shaped article. Therefore, in the present embodiment, the 0-th slice layer L0 means the shaping surface 21. In other words, in the present embodiment, the 1-st slice layer L1 is stacked on the 0-th slice layer L0, namely the shaping surface 21.

When stacking the n-th slice layer Ln on the (n−1)-th slice layer Ln−1 using the shaping control, the control device 60 controls the ejection unit 10 and the moving unit 30 to perform the ejection of the molding material X along the shaping path of the n-th slice layer VLn corresponding to the n-th slice layer Ln using the ejection unit 10. Thus, it is possible for the control device 60 to stack the n-th slice layer Ln on the (n−1)-th slice layer Ln−1. By performing such control as described hereinabove as the shaping control, the control device 60 sequentially performs the ejection of the molding material X to stack the N slice layers L on the shaping surface 21 to thereby shape the single three-dimensional shaped article.

Further, when the control device 60 stacks the second slice layer on the first slice layer in the shaping control, the control device 60 stacks the first boundary layer on the first slice layer, then stacks the second boundary layer on the first boundary layer, and then stacks the second slice layer on the second boundary layer as described above. Thus, it is possible for the control device 60 to prevent the delamination from occurring in the boundary between the first slice layer and the second slice layer formed of the respective materials different in heat shrinkage rate from each other.

Figure 2:
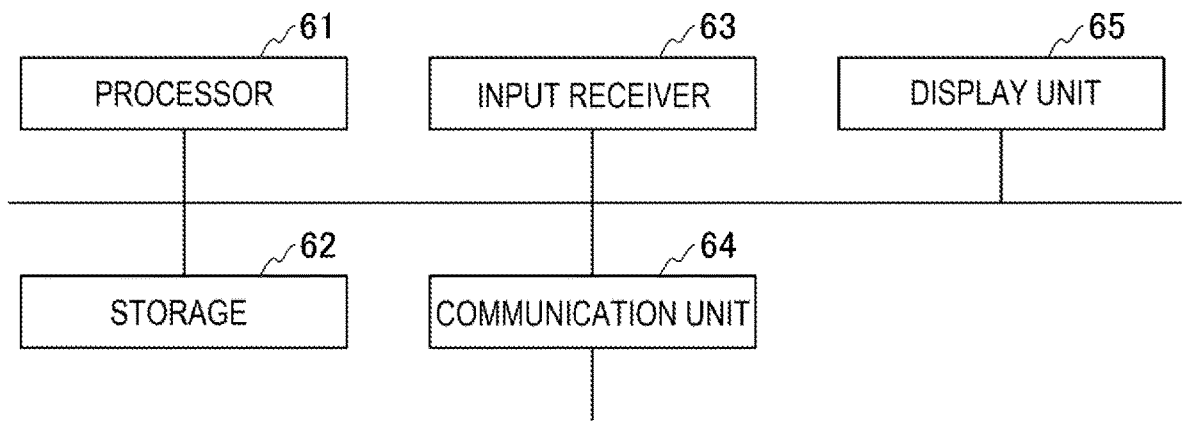
FIG. 2 is a diagram showing an example of a hardware configuration of a control device.

FIG. 2 is a diagram showing an example of a hardware configuration of the control device 60.

The control device 60 is provided with a processor 61, a storage 62, an input receiver 63, a communication unit 64, and a display unit 65. It should be noted that it is possible for the control device 60 to be an information processing device configured as a separate body from the three-dimensional shaping device 1 as described above. In this case, the three-dimensional shaping device 1 is connected to this information processing device so as to be able to communicate with each other, and is controlled by this information processing device.

The processor 61 is, for example, a CPU (Central Processing Unit). It should be noted that the processor 61 can also be another type of processor such as an FPGA (Field Programmable Gate Array). Further, the processor 61 can be constituted by a plurality of processors. The processor 61 executes a variety of programs, a variety of commands, and so on stored in the storage 62 to thereby realize a variety of functions provided to the control device 60.

The storage 62 includes an HDD (Hard Disk Drive), an SSD (Solid State Drive), an EEPROM (Electrically Erasable Programmable Read-Only Memory), a ROM (Read-Only Memory), a RAM (Random Access Memory), and so on. It should be noted that the storage 62 can also be an external storage device coupled using a digital input/output port such as USB (Universal Serial Bus) instead of one incorporated in the control device 60. The storage 62 stores a variety of programs, a variety of commands, a variety of types of information, and so on to be processed by the control device 60. For example, the storage 62 stores the three-dimensional shaping data, and so on.

The input receiver 63 receives an operation from the user performed while looking at an image displayed on the display unit 65. The input receiver 63 is an input device including, for example, a keyboard, a mouse, or a touch pad. It should be noted that the input receiver 63 can also be a touch panel configured integrally with the display unit 65.

The communication unit 64 is configured including, for example, a digital input/output port such as USB, or an Ethernet (a registered trademark) port.

The display unit 65 displays an image. The display unit 65 is a display device including, for example, a liquid crystal display panel, or an organic EL (Electro-Luminescence) display panel as a display provided to the control device 60.

Figure 3:
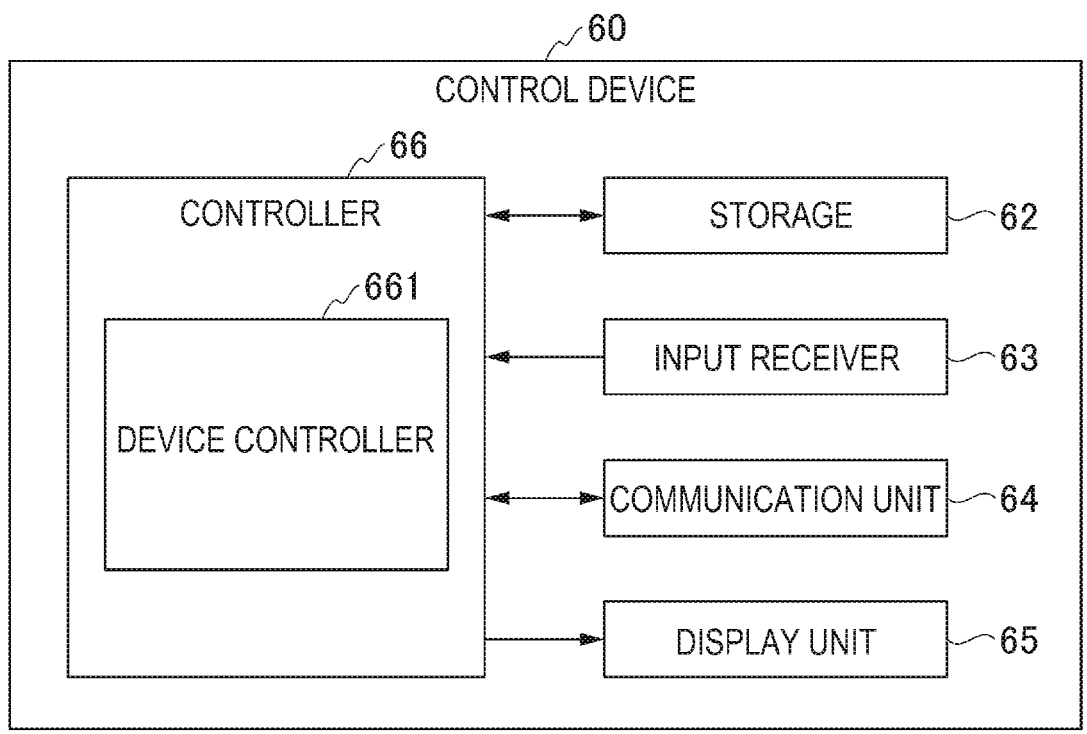
FIG. 3 is a diagram showing an example of a functional configuration of the control device.

FIG. 3 is a diagram showing an example of a functional configuration of the control device 60.

The control device 60 is provided with the storage 62, the input receiver 63, the communication unit 64, the display unit 65, and a controller 66.

The controller 66 controls a whole of the control device 60. The controller 66 is provided with a device controller 661. These functional units provided to the controller 66 are realized by, for example, the processor 61 executing a variety of programs stored in the storage 62. Further, some or all of the functional units can also be a hardware functional unit such as an LSI (Large Scale Integration), or an ASIC (Application Specific Integrated Circuit).

The device controller 661 controls the whole of the three-dimensional shaping device 1. For example, the device controller 661 controls each of the ejection unit 10, the moving unit 30, and the heater 40.

The data generation device 70 is a device for generating the three-dimensional shaping data to be used by the three-dimensional shaping device 1 to shape the three-dimensional shaped article. The data generation device 70 generates the three-dimensional shaping data using a method for the three-dimensional shaping device 1 described above to generate the three-dimensional shaping data. Therefore, the description of that method will be omitted here. Further, the data generation device 70 stores the shape data described above in accordance with an operation received. It should be noted that the data generation device 70 can be capable of generating the shape data, or can be unachievable of generating the shape data. When the data generation device 70 is not capable of generating the shape data, the data generation device 70 obtains the shape data from other devices via a network or a storage medium. Further, the data generation device 70 stores the slice condition information described above and shaping path generation condition information in accordance with an operation received.

The data generation device 70 is an information processing device such as a workstation, a desktop PC (Personal Computer), a laptop PC, a tablet PC, a multifunctional cellular phone unit (a smartphone), a cellular phone unit, or a PDA (Personal Digital Assistant), but is not limited to these devices. More specifically, the data generation device 70 is formed of a computer provided with at least one processor, a memory, and an input/output interface for performing input/output of a signal with the outside.

Processing of Control Device Performing Shaping Control

Figure 4:
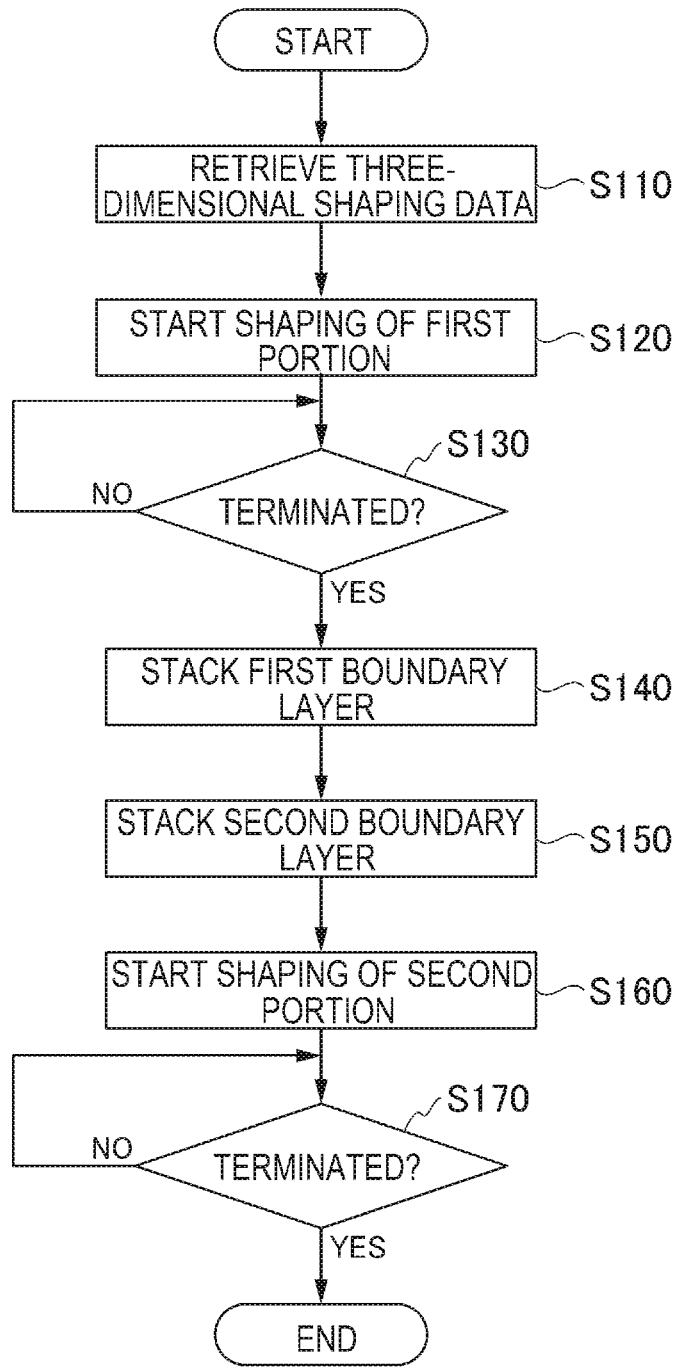
FIG. 4 is a diagram showing an example of a flow of processing of the control device performing shaping control.
Figure 5:
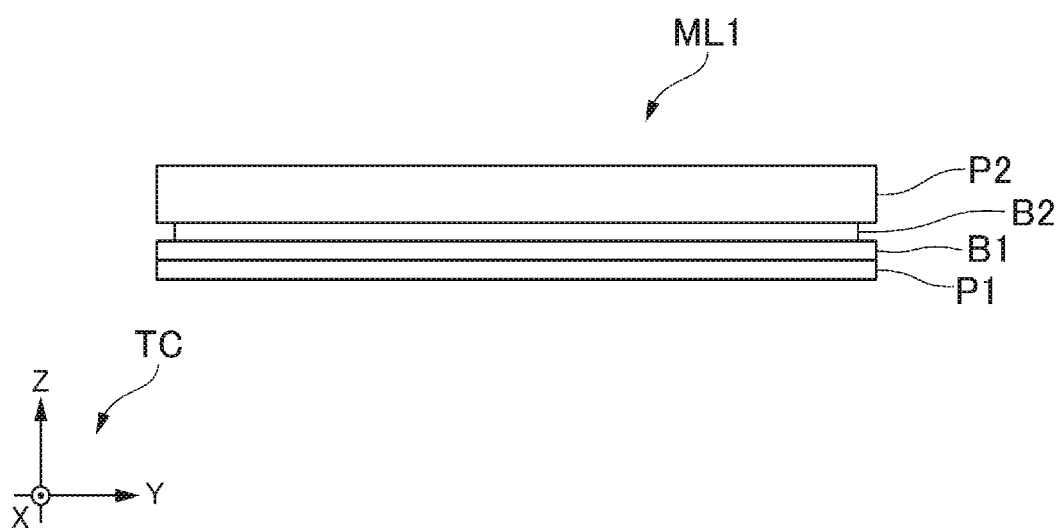
FIG. 5 is a diagram showing an example of an appearance of a three-dimensional shaped article.

The processing of the control device 60 performing the shaping control will hereinafter be described with reference to FIG. 4. FIG. 4 is a diagram showing an example of a flow of the processing of the control device 60 performing shaping control. Hereinafter, as an example, there will be described when the three-dimensional shaping data is stored in the storage 62 at a timing before processing in the step S110 shown in FIG. 4 is performed. Further, hereinafter, as an example, there will be described when the control device 60 receives an operation of making the control device 60 start the shaping control at that timing. Further, hereinafter, as an example, there will be described when the three-dimensional shaped article to be shaped by the three-dimensional shaping device 1 using the processing of the flowchart shown in FIG. 4 is a three-dimensional shaped article ML1 shown in FIG. 5. FIG. 5 is a diagram showing an example of an appearance of the three-dimensional shaped article ML1. The three-dimensional shaped article ML1 is a three-dimensional shaped article having a substantially rectangular solid shape obtained by stacking a second portion P2, which is formed to have a rectangular shape by stacking one or more second slice layer, on a first portion P1, which is formed to have a rectangular shape by stacking one or more first slice layer. The three-dimensional shaped article ML1 is one of components provided to a device such as a printer. In the three-dimensional shaped article ML1, for example, a sliding member is mounted on the second portion P2. In this case, since the three-dimensional shaped article ML1 receives a sliding motion of the member with the second portion P2 formed of the second material as, for example, POM low in friction coefficient, it is possible for the three-dimensional shaped article ML1 to prevent the first portion P1 from wearing due to the sliding motion of the member. When the three-dimensional shaping device 1 is going to shape the three-dimensional shaped article ML1 obtained by stacking the second portion P2 formed of the second material on the first portion P1 formed of the first material as described above, the three-dimensional shaping device 1 stacks a first boundary layer B1 on the first portion P1, stacks a second boundary layer B2 on the first boundary layer B1, and stacks the second portion P2 on the second boundary layer B2 as shown in FIG. 5. Thus, it is possible for the three-dimensional shaping device 1 to prevent the delamination from occurring in the boundary between the first portion P1 and the second portion P2, namely the first slice layer and the second slice layer, formed of the respective materials different in heat shrinkage rate from each other.

After the control device 60 receives the operation of making the control device 60 start the shaping control, the device controller 661 retrieves (step S110) the three-dimensional shaping data stored in advance in the storage 62 from the storage 62.

Then, the device controller 661 starts (step S120) shaping of the first portion P1 based on the three-dimensional shaping data retrieved in the step S110.

Then, the device controller 661 waits (step S130) until the shaping of the first portion P1 started in the step S120 is terminated. In FIG. 4, the processing in the step S130 is represented by "TERMINATED?" Here, the device controller 661 determines whether or not the shaping of the first portion P1 is terminated based on, for example, the three-dimensional shaping data retrieved in the step S110. It should be noted that it is possible for the device controller 661 to determine whether or not the shaping of the first portion P1 is terminated using any methods.

Figure 6:
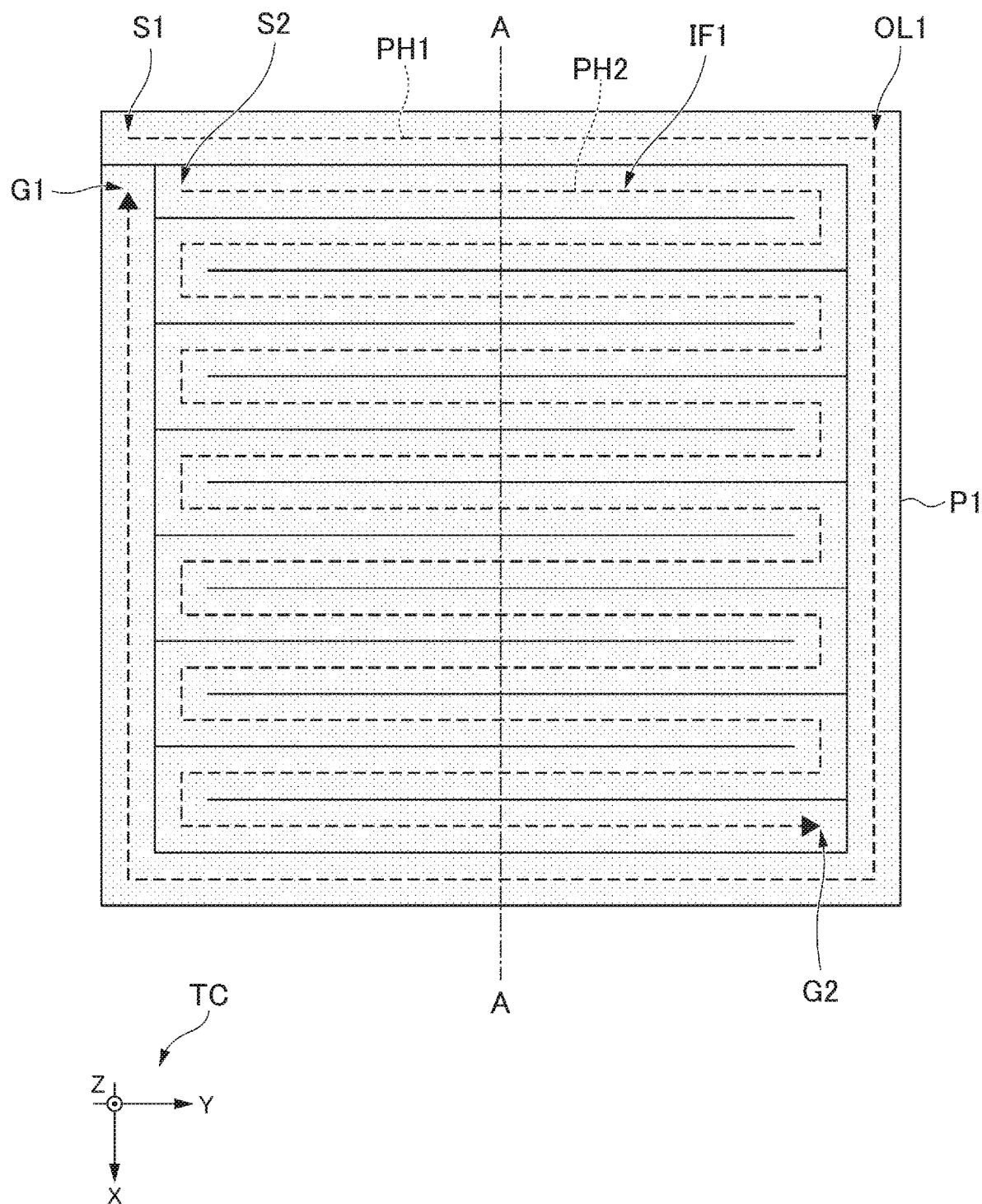
FIG. 6 is a top view showing an example of an appearance of a first portion.

Here, FIG. 6 is a top view showing an example of an appearance of the first portion P1. In the example shown in FIG. 6, the first portion P1 is formed of a single first slice layer. Further, in that example, an outline OL1 of the first slice layer forming the first portion P1 is shaped by the three-dimensional shaping device 1 ejecting the first material along the shaping path PH1 from a starting point S1 toward an ending point G1 shown in FIG. 6. Further, in that example, an infill IF1 of the first slice layer forming the first portion P1 is shaped by the three-dimensional shaping device 1 ejecting the first material along the shaping path PH2 from a starting point S2 toward an ending point G2 shown in FIG. 6. It should be noted that in FIG. 6, each of the shaping path PH1 and the shaping path PH2 is represented by a dotted arrow. Further, in FIG. 6, an area with hatching represents an area where the first material is ejected. In other words, in that example, the filling rate with the infill IF1 is 100% Therefore, in that example, the first slice layer forming the first portion P1 is the first solid layer. It should be noted that the first portion P1 can be formed by stacking a plurality of first slice layers. In this case, in the plurality of first slice layers, there is included the shaped layer in addition to the first solid layer.

When the device controller 661 determines that the shaping of the first portion P1 started in the step S120 is terminated (YES in the step S130), the device controller 661 stacks (step S140) the first boundary layer B1 on the first portion P1.

Figure 7:
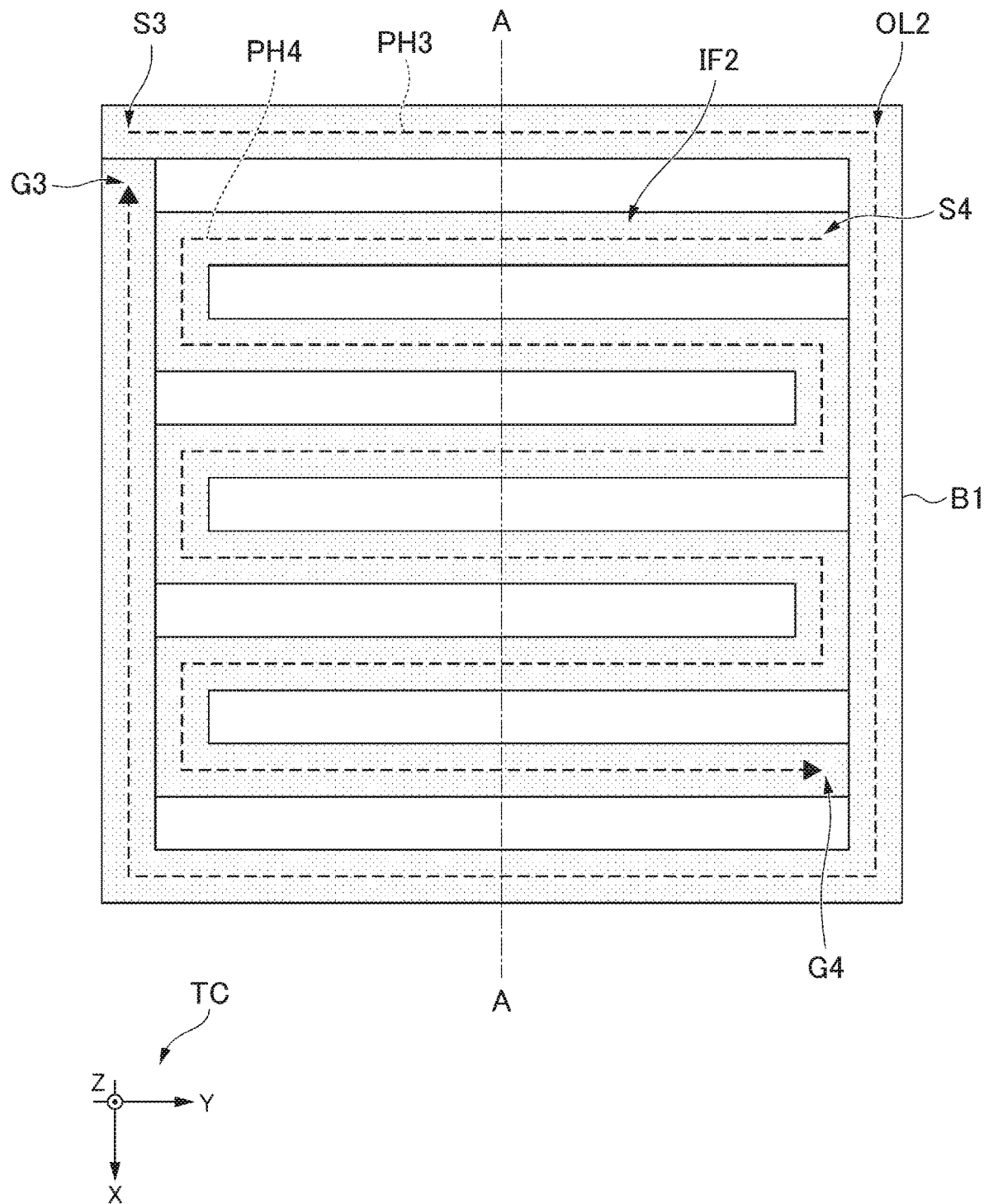
FIG. 7 is a top view showing an example of an appearance of a first boundary layer.

Here, FIG. 7 is a top view showing an example of an appearance of the first boundary layer B1. In the example shown in FIG. 7, the first boundary layer B1 is formed of a single slice layer L. However, it is desirable for the first boundary layer B1 to be formed of two or more slice layers L. This is because it is possible to deepen the depth of each of voids provided to the first boundary layer B1 to make it easy for the second boundary layer B2 to infiltrate into each of these voids. For example, it is possible for the first boundary layer B1 to be shaped by stacking five slice layers L on one another. In this case, it is possible for the three-dimensional shaping device 1 to set the thickness of the first boundary layer B1 to, for example, about 1 cm. As a result, since the depth of the second boundary layer which infiltrates into the voids is deepened, it is possible to elongate the length of an area where the second boundary layer and the first boundary layer engaged with each other.

Further, in the example shown in FIG. 7, an outline OL2 of the first boundary layer B1 is shaped by the three-dimensional shaping device 1 ejecting the first material along a shaping path PH3 from a starting point S3 toward an ending point G3 shown in FIG. 7. Further, in that example, an infill IF2 of the first boundary layer B1 is shaped by the three-dimensional shaping device 1 ejecting the first material along a shaping path PH4 from a starting point S4 toward an ending point G4 shown in FIG. 7. It should be noted that in FIG. 7, each of the shaping path PH3 and the shaping path PH4 is represented by a dotted arrow. Further, in FIG. 7, an area with hatching represents an area where the first material is ejected. In other words, in that example, the filling rate with the infill IF2 is lower than 100%. In this case, as shown in FIG. 7, the first boundary layer B1 is provided with a plurality of voids corresponding to the filling rate with the infill IF2. In order to engage the second boundary layer B2 with the first boundary layer B1, it is sufficient for the filling rate with the infill IF2 to be a filling rate in a range of no lower than 20% and no higher than 90%. It should be noted that when the filling rate with the infill IF2 is the filling rate in the range of no lower than 30% and no higher than 80%, the second boundary layer B2 more surely engages with the first boundary layer B1. It is possible for the device controller 661 to change the filling rate with the infill IF2 by, for example, arranging infill paths adjacent to each other at a predetermined distance from each other in the infill paths for forming the infill IF2. In other words, it is possible for the device controller 661 to change the filling rate with the infill IF2 by arranging the shaping paths PH4 at a predetermined distance from each other. For example, in an experiment conducted by the inventors, when the predetermined distance was a distance about ¼ of the width of the shaping path of the infill IF2, the filling rate with the infill IF2 was about 20%. The correspondence relationship between the predetermined distance and the filling rate with the infill IF2 can be identified by a preliminary experiment, a variety of theoretical calculations, and so on. Further, the distance considered to be the most suitable as the predetermined distance can be determined by a preliminary experiment and so on, or can also be determined by other methods. As the other methods described above, there can be cited, for example, a method based on a correlative relationship between a ratio between the inner diameter of the nozzle Nz and the length in a longitudinal direction of the infill IF2, and the strength of the engagement of the second boundary layer B2 with the first boundary layer B1. Here, the longitudinal direction of the infill IF2 is a direction in which the length of the shaping path PH4 is longer out of the two directions in which the shaping path PH4 extends. In other words, in that example, the longitudinal direction of the infill IF2 is a direction parallel to the Y axis. When using this method, it is necessary to obtain such a correlative relationship by a preliminary experiment or the like. Further, when using this method, it is possible to enhance the convenience by expressing such a correlative relationship as a table in advance. In that example, the first boundary layer B1 is provided with seven voids extending in a direction parallel to the Y axis. Further, in that example, the filling rate with the infill IF2 is about 45%. It should be noted that the device controller 661 can be provided with a configuration of forming the first boundary layer B1 using other methods. For example, it is possible for the device controller 661 to have a configuration of stacking the first boundary layer B1 having the infill IF2 provided with a plurality of voids formed at random positions on the first portion P1.

Further, in the example shown in FIG. 7, the longitudinal direction of the infill IF2 is a direction parallel to the longitudinal direction of the infill IF1 in the first portion P1. The longitudinal direction of the infill IF1 is a direction in which the length of the shaping path PH2 of the infill IF1 is longer out of the two directions in which the shaping path PH2 extends. However, it is possible for the device controller 661 to have a configuration of stacking the first boundary layer B1 on the first portion P1 so that these two longitudinal directions cross each other. In this case, it is possible for the three-dimensional shaping device 1 to enhance the interlayer adhesiveness between the first portion P1 and the first boundary layer B1.

It should be noted that it is possible for the device controller 661 to have a configuration of controlling the heater 40 so as to make the temperature of the first boundary layer B1 when forming the first boundary layer B1 higher than the temperature of the first portion P1 when forming the first portion P1. Thus, it is possible for the three-dimensional shaping device 1 to prevent the second boundary layer B2 from being cooled by the first boundary layer B1 when stacking the second boundary layer B2 on the first boundary layer B1 in the step S150 described later. As a result, it is possible for the three-dimensional shaping device 1 to more surely prevent the delamination from occurring in the boundary between the first boundary layer B1 and the second boundary layer B2. A method of heating the first boundary layer B1 with the heater 40 for realizing the above can be a known method, or can also be a method developed in the future.

After performing the processing in the step S140, the device controller 661 stacks (step S150) the second boundary layer B2 on the first boundary layer B1 which has been shaped in the step S140.

Figure 8:
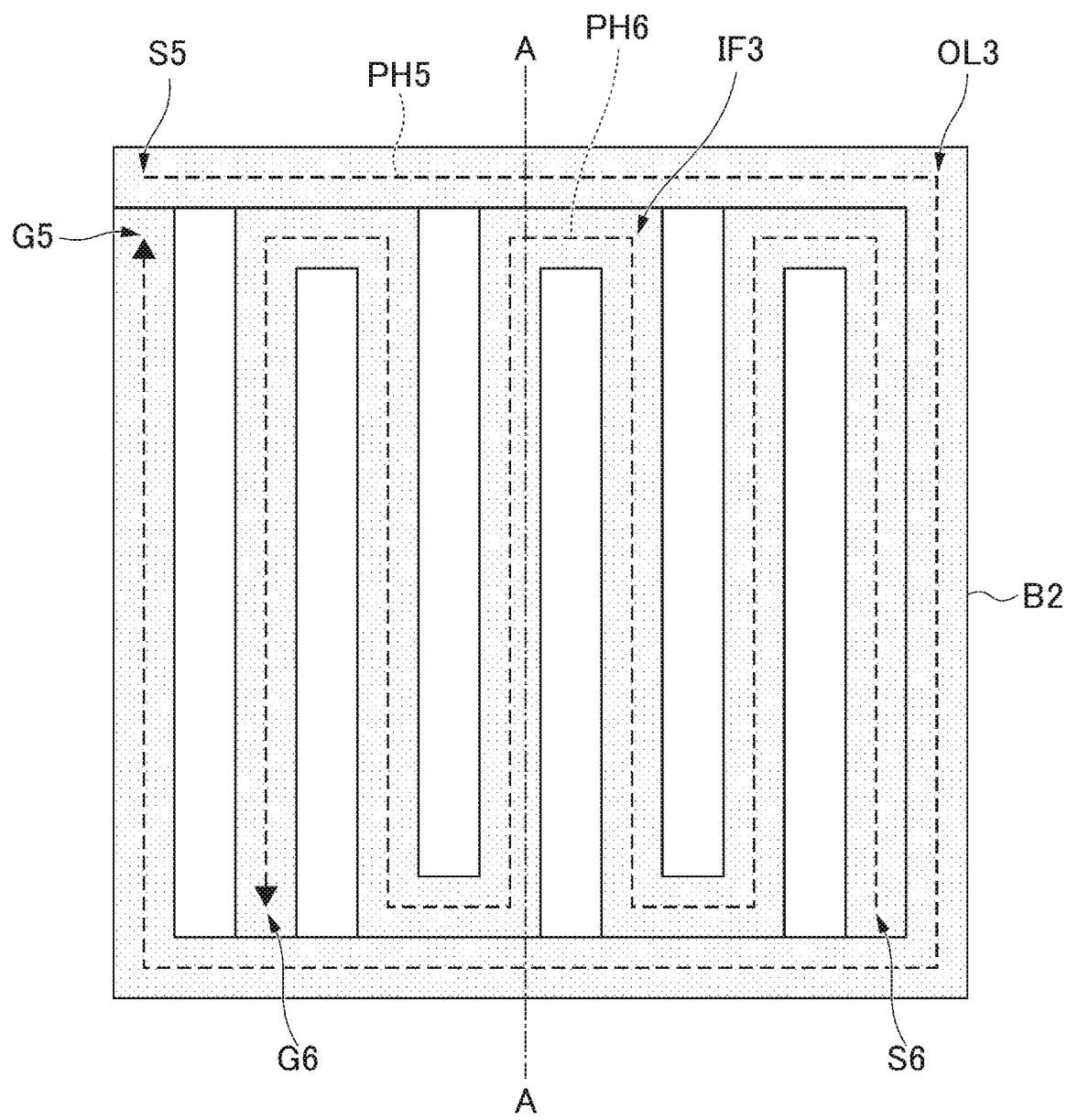
FIG. 8 is a top view showing an example of an appearance of a second boundary layer.

Here, FIG. 8 is a top view showing an example of an appearance of the second boundary layer B2. As shown in FIG. 8, the second boundary layer B2 is formed of a single slice layer L. This is because when thickening the second boundary layer B2, a degree of the heat shrinkage of the second boundary layer B2 formed of the second material having a higher heat shrinkage rate than that of the first material becomes higher, which increases the possibility that the second boundary layer B2 separates from the first boundary layer B1 as the temperature decreases.

Further, in the example shown in FIG. 8, an outline OL3 of the second boundary layer B2 is shaped by the three-dimensional shaping device 1 ejecting the second material along a shaping path PH5 from a starting point S5 toward an ending point G5 shown in FIG. 8. Further, in that example, an infill IF3 of the second boundary layer B2 is shaped by the three-dimensional shaping device 1 ejecting the second material along a shaping path PH6 from a starting point S6 toward an ending point G6 shown in FIG. 8. It should be noted that in FIG. 8, each of the shaping path PH5 and the shaping path PH6 is represented by a dotted arrow. Further, in FIG. 8, an area with hatching represents an area where the second material is ejected. The device controller 661 arranges, for example, the infill paths adjacent to each other at a predetermined second distance from each other in the infill paths for forming the infill IF3. In other words, the device controller 661 arranges, for example, the shaping paths PH6 at a predetermined second distance from each other. Thus, it is possible for the three-dimensional shaping device 1 to make the filling rate with the infill IF3 lower than 100%, and as a result, it is possible to decrease the degree of the deformation due to the heat shrinkage of the second boundary layer B2. This is because the higher the filling rate with the infill IF3, the higher the degree of the heat shrinkage of the second boundary layer B2 formed of the second material having a higher heat shrinkage rate than that of the first material becomes, which increases the possibility that the second boundary layer B2 separates from the first boundary layer B1 as the temperature decreases. It should be noted that the predetermined second distance can be the same as the predetermined distance, and can also be a distance different from the predetermined distance.

Figure 9:
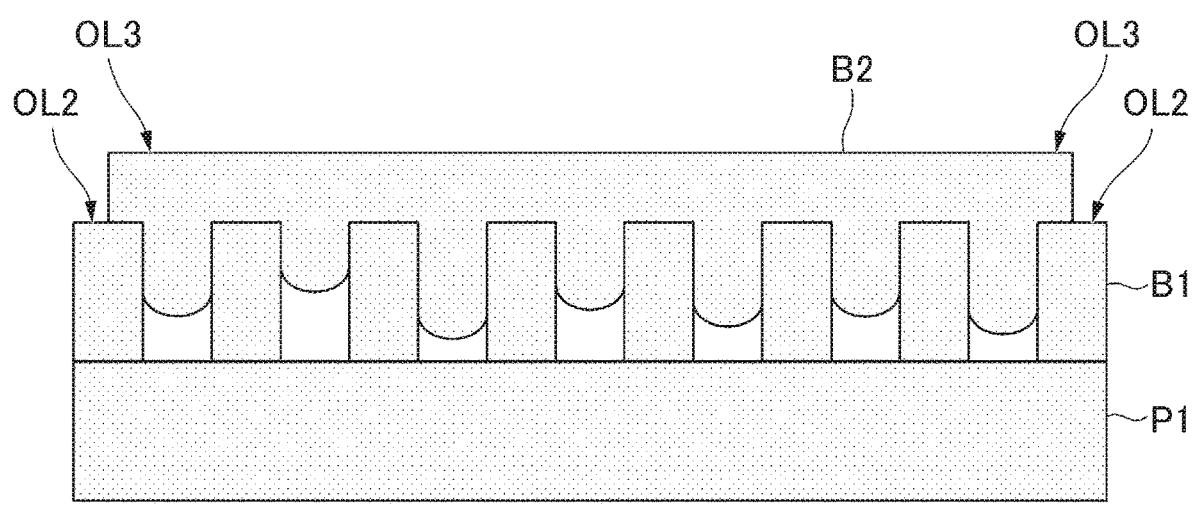
FIG. 9 is a diagram showing an example of a condition in which a part of the second boundary layer infiltrates into a plurality of voids provided to the first boundary layer.
Figure 9:
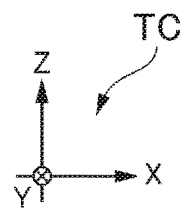

Further, the longitudinal direction of the infill IF3 is a direction crossing the longitudinal direction of the infill IF2 in the first boundary layer B1. In the example shown in FIG. 8, the longitudinal direction in which the infill IF3 in the second boundary layer B2 extends crosses the longitudinal direction in which the infill IF2 in the first boundary layer B1 extends. Here, the longitudinal direction of the infill IF3 is a direction in which the length of the shaping path PH6 is longer out of the two directions in which the shaping path PH6 extends. In other words, in that example, the longitudinal direction of the infill IF3 is a direction parallel to the X axis. Thus, it is possible for the three-dimensional shaping device 1 to make a part of the second boundary layer B2 more surely infiltrate into the plurality of voids provided to the first boundary layer B1. Here, FIG. 9 is a diagram showing an example of a condition in which a part of the second boundary layer B2 infiltrates into the plurality of voids provided to the first boundary layer B1. Further, FIG. 9 is a cross-sectional view of each of the first portion P1, the first boundary layer B1, and the second boundary layer B2 cut by the cutting surface A-A shown in each of FIG. 6 through FIG. 8. It should be noted that the thickness of each of the first portion P1, the first boundary layer B1, and the second boundary layer B2 shown in FIG. 9 is drawn as a thickness different from the thickness of each of the first portion P1, the first boundary layer B1, and the second boundary layer B2 shown in FIG. 5 in order to clearly show the infiltration of a part of the second boundary layer B2 into the plurality of voids provided to the first boundary layer B1. As shown in FIG. 9, when the second boundary layer B2 is stacked on the first boundary layer B1, a part of the second boundary layer B2 infiltrates into the plurality of voids provided to the first boundary layer B1. Thus, the second boundary layer B2 and the first boundary layer B1 engage with each other. As a result, it is possible for the three-dimensional shaping device 1 to prevent the delamination from occurring in the boundary between the first boundary layer B1 and the second boundary layer B2.

It should be noted that it is possible for the device controller 661 to have a configuration of stacking the second boundary layer B2 on the first boundary layer B1 so that the longitudinal direction of the infill IF3 in the second boundary layer B2 and the longitudinal direction of the infill IF2 in the first boundary layer B1 become parallel to each other. It should be noted that in this case, there occurs a phenomenon that it becomes difficult for a part of the second boundary layer B2 to infiltrate into the plurality of voids provided to the first boundary layer B1, or a phenomenon that it becomes too easy for a part of the second boundary layer B2 to infiltrate into the plurality of voids provided to the first boundary layer B1. When there occurs the phenomenon that it becomes difficult for a part of the second boundary layer B2 to infiltrate into the plurality of voids provided to the first boundary layer B1, it becomes difficult for the second boundary layer B2 and the first boundary layer B1 to engage with each other, and it becomes easy for the second boundary layer B2 to separate from the first boundary layer B1. In contrast, when there occurs the phenomenon that it becomes too easy for a part of the second boundary layer B2 to infiltrate into the plurality of voids provided to the first boundary layer B1, it becomes difficult for the second boundary layer B2 to form the slice layer L on the first boundary layer B1, and as a result, it becomes easy to cause a shaping failure. In order to prevent the above, when the device controller 661 stacks the second boundary layer B2 on the first boundary layer B1 so that these two longitudinal directions become parallel to each other, the device controller 661 makes the thickness of the shaping path in the second boundary layer B2 thicker than the thickness of the void of the first boundary layer B1 in a direction in which the void extends, or makes the thickness of the shaping path in the second boundary layer B2 thicker than the thickness of the shaping path in the first boundary layer B1 as shown in FIG. and FIG. 11. Thus, it is possible for the three-dimensional shaping device 1 to make it easy for a part of the second boundary layer B2 to infiltrate into the plurality of voids provided to the first boundary layer B1 while preventing the shaping failure of the second boundary layer B2 from occurring even in that case.

Figure 10:
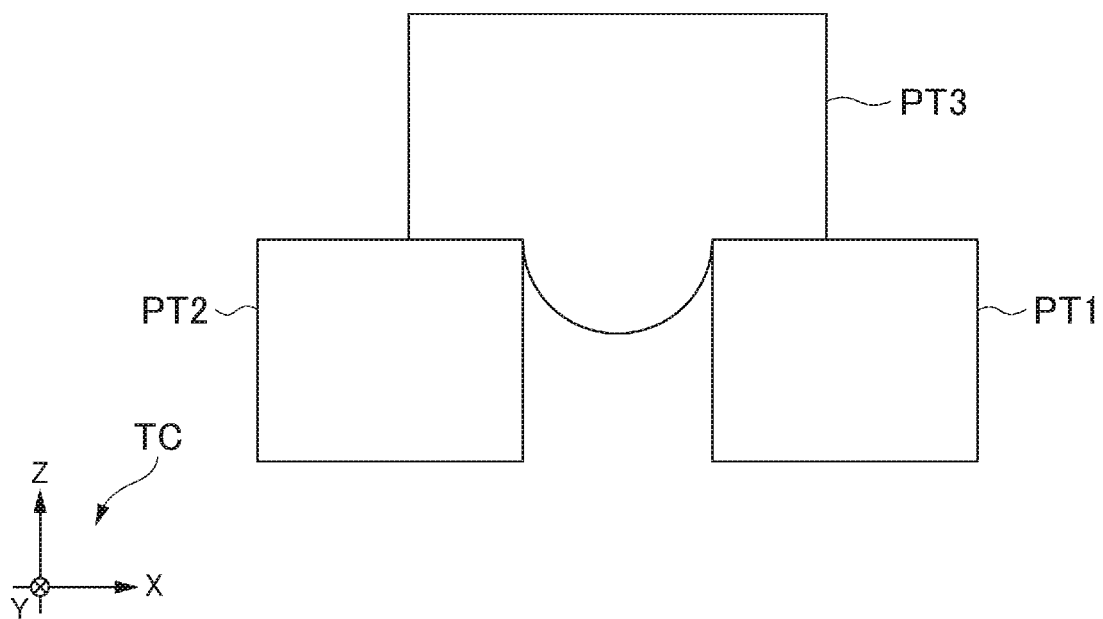
FIG. 10 is a diagram showing an example of a condition in which a part of the second boundary layer infiltrates into the void of the first boundary layer when the thickness of a shaping path in the second boundary layer is thicker than the thickness of the void of the first boundary layer in a direction in which the void extends.

Here, FIG. 10 is a diagram showing an example of a condition in which a part of the second boundary layer B2 infiltrates into the void of the first boundary layer B1 when the thickness of the shaping path in the second boundary layer B2 is thicker than the thickness of the void of the first boundary layer B1 in the direction in which the void extends. Each of a shaping path PT1 and a shaping path PT2 shown in FIG. 10 is an example of the shaping path in the first boundary layer B1. In other words, in the example shown in FIG. 10, the void between the shaping path PT1 and the shaping path PT2 is an example of the void of the first boundary layer B1. Further, the shaping path PT3 shown in FIG. 10 is an example of the shaping path in the second boundary layer B2. As shown in FIG. 10, when the thickness of the shaping path PT3 is thicker than the thickness of the void between the shaping path PT1 and the shaping path PT2, a part of the shaping path PT3 infiltrates into that void. In contrast, in that case, the rest of the shaping path PT3 remains on the shaping path PT1 and the shaping path PT2. As a result, when the thickness of the shaping path in the second boundary layer B2 is thicker than the thickness of the void of the first boundary layer B1 in the direction in which the void extends, it becomes difficult for the shaping failure of the second boundary layer B2 to occur, and at the same time, it becomes easy for a part of the second boundary layer B2 to infiltrate into the plurality of voids provided to the first boundary layer B1. In other words, it is possible for the three-dimensional shaping device 1 to make it easy for a part of the second boundary layer B2 to infiltrate into the plurality of voids provided to the first boundary layer B1 while preventing the shaping failure of the second boundary layer B2 from occurring.

Figure 11:
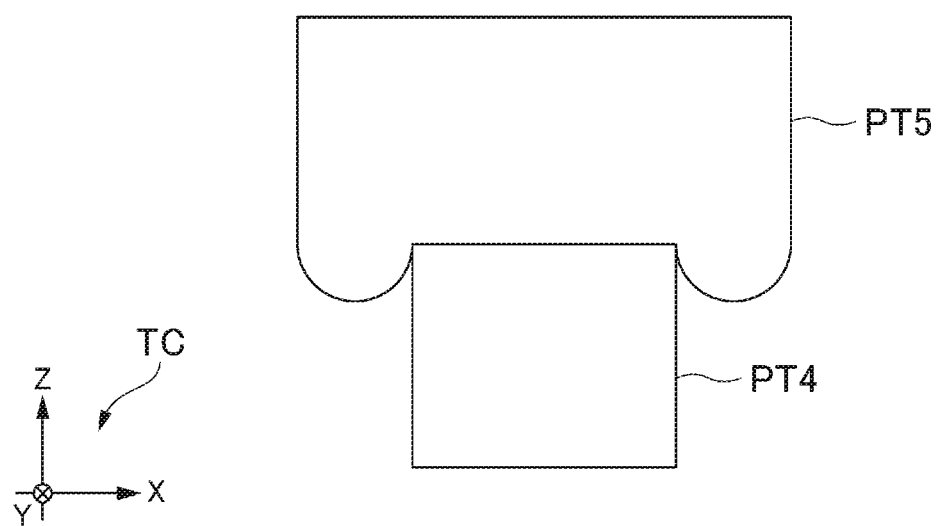
FIG. 11 is a diagram showing an example of a condition in which a part of the second boundary layer infiltrates into the void of the first boundary layer when the thickness of the shaping path in the second boundary layer is thicker than the thickness of a shaping path in the first boundary layer.

In contrast, FIG. 11 is a diagram showing an example of a condition in which a part of the second boundary layer B2 infiltrates into the void of the first boundary layer B1 when the thickness of the shaping path in the second boundary layer B2 is thicker than the thickness of the shaping path in the first boundary layer B1. The shaping path PT4 shown in FIG. 11 is an example of the shaping path in the first boundary layer B1. In other words, in the example shown in FIG. 11, the voids at both sides of the shaping path PT4 are each an example of the void of the first boundary layer B1. Further, the shaping path PT5 shown in FIG. 11 is an example of the shaping path in the second boundary layer B2. As shown in FIG. 11, when the thickness of the shaping path PT5 is thicker than the thickness of the shaping path PT4, a part of the shaping path PT5 infiltrates into the voids at both sides of the shaping path PT4. In contrast, in that case, the rest of the shaping path PT5 remains on the shaping path PT4. As a result, when the thickness of the shaping path in the second boundary layer B2 is thicker than the thickness of the shaping path in the first boundary layer B1, it becomes difficult for the shaping failure of the second boundary layer B2 to occur, and at the same time, it becomes easy for a part of the second boundary layer B2 to infiltrate into the plurality of voids provided to the first boundary layer B1. In other words, it is possible for the three-dimensional shaping device 1 to make it easy for a part of the second boundary layer B2 to infiltrate into the plurality of voids provided to the first boundary layer B1 while preventing the shaping failure of the second boundary layer B2 from occurring.

Further, in the example shown in FIG. 5 and FIG. 9, when viewing the first boundary layer B1 from the stacking direction of the first portion P1 and the second portion P2, the contour of the second boundary layer B2 is included inside the contour of the first boundary layer B1. In other words, it is possible for the device controller 661 to have a configuration of shaping the outline OL3 of the second boundary layer B2 so that the outline OL3 is included inside the outline OL2 of the first boundary layer B1 in that case. This is because the void of the first boundary layer B1 does not exist on the outline OL2, and therefore, the second boundary layer B2 separates from the first boundary layer B1 due to the heat shrinkage of the second boundary layer B2 in some cases. In order to prevent the above, the three-dimensional shaping device 1 shapes the outline OL3 so that the outline OL3 is included inside the outline OL2 in that case. Thus, it is possible for the three-dimensional shaping device 1 to make a part of the outline OL3 infiltrate into the void provided to the first boundary layer B1 to thereby prevent the delamination of the second boundary layer B2 from the first boundary layer B1 on the outline OL2 from occurring. It should be noted that in this case, it is possible for the device controller 661 to have a configuration of making the thickness of the second boundary layer B2 thinner than the thickness of each of the second slice layers constituting the second portion P2 described later when forming the second boundary layer B2. Thus, it is possible for the three-dimensional shaping device 1 to prevent dimensional accuracy of the three-dimensional shaped article ML1 from decreasing due to the thickness of the second boundary layer B2 having the contour included inside the contour of the first boundary layer B1.

Here, it is possible for the device controller 661 to have a configuration of forming the infill IF3 after forming, for example, the outline OL3 when forming the second boundary layer B2. This is because when a material such as POM is used as the second material, there occurs a failure in forming the second boundary layer B2 in some cases when forming the infill IF3 in advance. In other words, thus, it is possible for the three-dimensional shaping device 1 to easily perform the formation of the second boundary layer B2.

Further, it is possible for the device controller 661 to have a configuration of controlling, for example, the heater 40 so as to make the temperature of the first boundary layer B1 higher than the temperature of the first boundary layer B1 when forming the infill IF3, when forming the outline OL3. Thus, it is possible for the three-dimensional shaping device 1 to enhance the interlayer adhesiveness between the outline OL3 and the first boundary layer B1. Further, it is possible for the three-dimensional shaping device 1 to shape the infill IF3 so as to make contact with the outline OL3, and as a result, it is possible to prevent the shaping failure of the second boundary layer B2 from occurring.

Further, it is possible for the device controller 661 to have a configuration of decreasing the relative moving speed between the ejection unit 10 and the stage 20 with the moving unit 30 while keeping, for example, a supply rate of the second material with the ejection unit 10 in order to promote the infiltration of a part of the second boundary layer B2 into the plurality of voids provided to such a first boundary layer B1 as shown in FIG. 9 when forming the second boundary layer B2. In this case, the supply amount per unit area of the second material when forming the second boundary layer B2 becomes higher than the supply amount per unit area of the second material when forming the second portion P2. Thus, it is possible for the three-dimensional shaping device 1 to increase an infiltration amount of a part of the second boundary layer B2 into the plurality of voids. As a result, it is possible for the three-dimensional shaping device 1 to more surely prevent the delamination from occurring in the boundary between the first boundary layer B1 and the second boundary layer B2.

Further, it is possible for the device controller 661 to have a configuration of increasing the supply rate of the second material with the ejection unit 10 while keeping, for example, the relative moving speed between the ejection unit 10 and the stage 20 with the moving unit 30 in order to promote the infiltration of a part of the second boundary layer B2 into the plurality of voids provided to such a first boundary layer B1 as shown in FIG. 9 when forming the second boundary layer B2. In this case, the supply amount per unit area of the second material when forming the second boundary layer B2 also becomes higher than the supply amount per unit area of the second material when forming the second portion P2. Thus, it is possible for the three-dimensional shaping device 1 to increase the infiltration amount of a part of the second boundary layer B2 into the plurality of voids. As a result, it is possible for the three-dimensional shaping device 1 to more surely prevent the delamination from occurring in the boundary between the first boundary layer B1 and the second boundary layer B2.

After performing the processing in the step S150, the device controller 661 starts (step S160) shaping of the second portion P2. It should be noted that hereinafter, as an example, there is described when the second portion P2 is a portion in which three second slice layers each having a rectangular solid shape, namely the second slice layer P21 through the second slice layer P23, are stacked out of portions provided to the three-dimensional shaped article ML1. It should be noted that the second portion P2 can be a portion in which two or less second slice layers are stacked out of the portions provided to the three-dimensional shaped article ML1, or can also be a portion in which four or more second slice layers are stacked out of the portions provided to the three-dimensional shaped article ML1.

Then, the device controller 661 waits (step S170) until the shaping of the second portion P2 started in the step S160 is terminated. In FIG. 4, the processing in the step S170 is represented by "TERMINATED?" Here, the device controller 661 determines whether or not the shaping of the second portion P2 is terminated based on, for example, the three-dimensional shaping data retrieved in the step S110. It should be noted that it is possible for the device controller 661 to determine whether or not the shaping of the second portion P2 is terminated using any methods.

Figure 12:
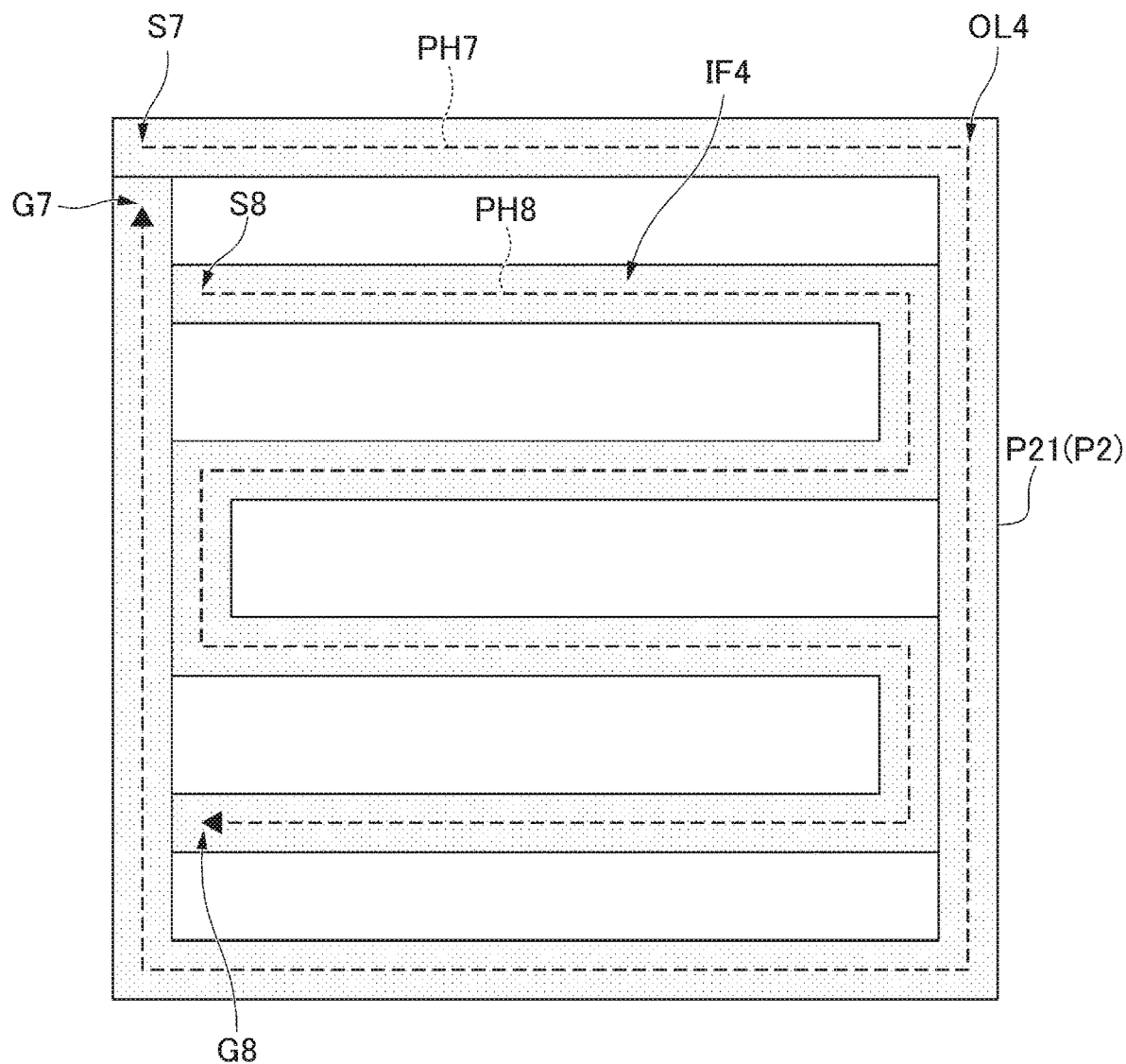
FIG. 12 is a top view showing an example of an appearance of a second slice layer as the lowermost layer out of three second slice layers stacked on one another as a second portion.

Here, FIG. 12 is a top view showing an example of an appearance of the second slice layer P21 as the lowermost layer out of the three second slice layers stacked on one another as the second portion P2. In the example shown in FIG. 12, an outline OL4 of the second slice layer P21 is shaped by the three-dimensional shaping device 1 ejecting the second material along a shaping path PH7 from a starting point S7 toward an ending point G7 shown in FIG. 12. Further, in that example, an infill IF4 of the second slice layer P21 is shaped by the three-dimensional shaping device 1 ejecting the second material along a shaping path PH8 from a starting point S8 toward an ending point G8 shown in FIG. 12. It should be noted that in FIG. 12, each of the shaping path PH7 and the shaping path PH8 is represented by a dotted arrow. Further, in FIG. 12, an area with hatching represents an area where the second material is ejected. In other words, in that example, the filling rate with the infill IF4 is lower than 100%. The device controller 661 arranges, for example, the infill paths adjacent to each other at a predetermined third distance from each other in the infill paths for forming the infill IF4. In other words, the device controller 661 arranges, for example, the shaping paths PH8 at the predetermined third distance from each other. Thus, it is possible for the three-dimensional shaping device 1 to make the filling rate with the infill IF4 lower than 100%, and as a result, it is possible to decrease the degree of the deformation due to the heat shrinkage of the second slice layer P21. This is because the higher the filling rate with the infill IF4 becomes, the higher the degree of the heat shrinkage of the second slice layer P21, and a tensile stress is generated in the second boundary layer B2 in the boundary with the first boundary layer B1 due to the compressive stress in the second slice layer P21 corresponding to a decrease in temperature, which increases the possibility that the second boundary layer B2 separates from the first boundary layer B1. Due to such a circumstance as described above, the device controller 661 sets the filling rate with the infill IF4 inside the outline OL4 in the second slice layer P21 as the lowermost layer to, for example, the lowest filling rate out of the filling rates with the infill inside the outlines in the three second slice layers stacked on the second boundary layer B2. It should be noted that the predetermined third distance can be the same as at least one of the predetermined distance and the predetermined second distance, or can also be different from both of the predetermined distance and the predetermined second distance. Further, it is possible for the device controller 661 to have a configuration of setting the filling rates with the infill inside the outlines of the second slice layers other than the lowermost layer to the lowest filling rate out of the filling rates with the infill inside the outlines of the three second slice layers stacked on the second boundary layer B2 when it has proved that the possibility that the second boundary layer B2 separates from the first boundary layer B1 does not increase from, for example, a preliminary experiment.

Further, the longitudinal direction of the infill IF4 is a direction crossing the longitudinal direction of the infill IF3 in the second boundary layer B2. In the example shown in FIG. 12, the longitudinal direction of the infill IF4 is perpendicular to the longitudinal direction of the infill IF3. Here, the longitudinal direction of the infill IF4 is a direction in which the length of the shaping path PH8 is longer out of the two directions in which the shaping path PH8 extends. In other words, in that example, the longitudinal direction of the infill IF4 is a direction parallel to the Y axis. Thus, it is possible for the three-dimensional shaping device 1 to enhance the interlayer adhesiveness between the second slice layer P21 and the second boundary layer B2. In other words, it is possible for the three-dimensional shaping device 1 to enhance the interlayer adhesiveness between the second portion P2 and the second boundary layer B2.

Further, the device controller 661 forms the outline OL4 so that at least a part of the outline OL2 in the first boundary layer B1 and at least a part of the outline OL4 overlap each other when viewing the first boundary layer B1 from the stacking direction of the first portion P1 and the second portion P2. In the example shown in FIG. 12, in that case, the device controller 661 forms the outline OL4 so that the outline OL2 and the outline OL4 overlap each other. Thus, it is possible for the three-dimensional shaping device 1 to prevent the dimensional accuracy of the three-dimensional shaped article ML1 from decreasing due to a difference between the size of the contour of the first boundary layer B1 and the size of the contour of the second boundary layer B2.

Figure 13:
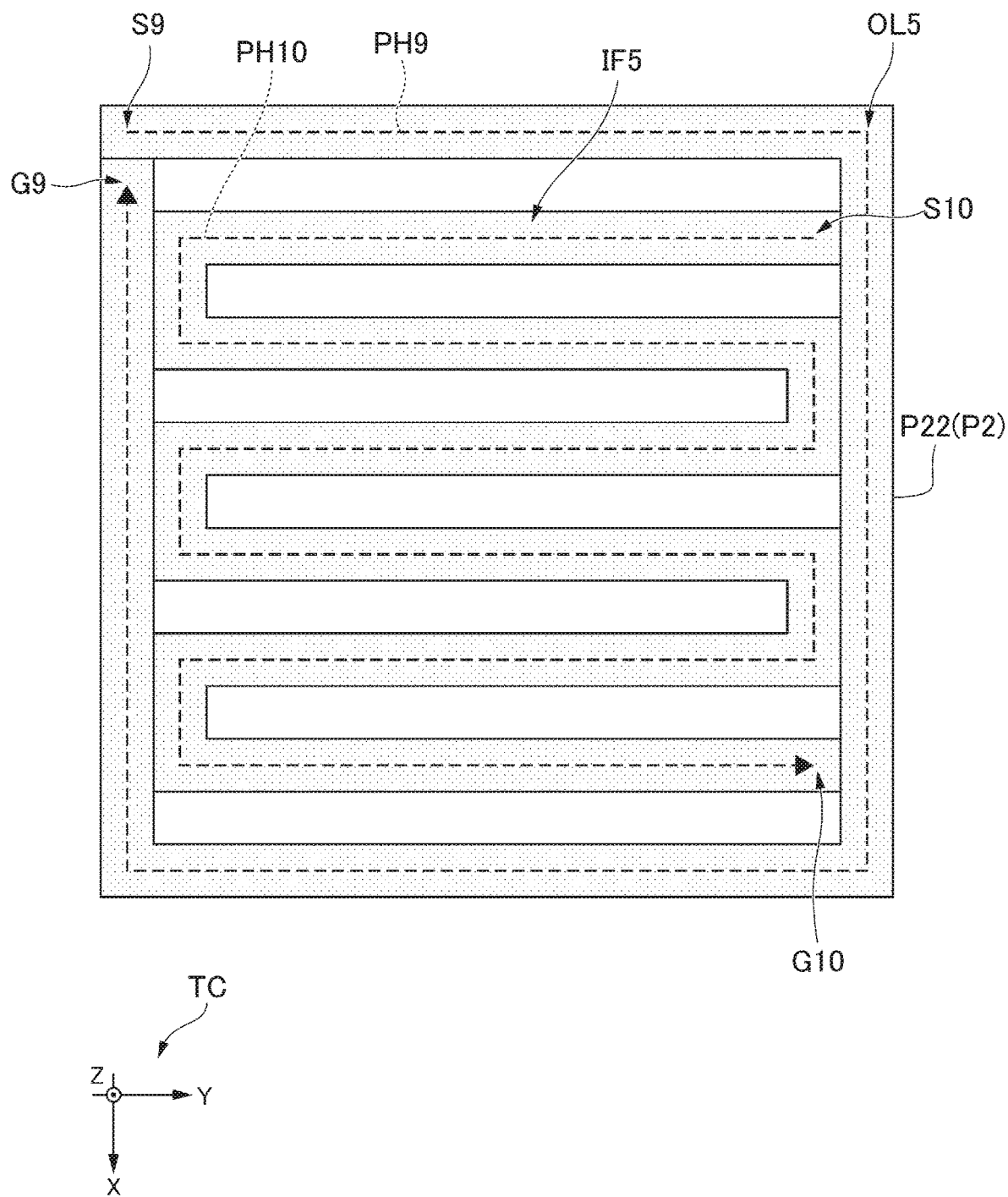
FIG. 13 is a top view showing an example of an appearance of a second slice layer as the center layer out of the three second slice layers stacked on one another as the second portion.

The device controller 661 stacks such a second slice layer P21 on the second boundary layer B2, and then stacks the second slice layer P22 shown in FIG. 13 on the second slice layer P21. FIG. 13 is a top view showing an example of an appearance of the second slice layer P22 as the center layer out of the three second slice layers stacked on one another as the second portion P2. In the example shown in FIG. 13, an outline OL5 of the second slice layer P22 is shaped by the three-dimensional shaping device 1 ejecting the second material along a shaping path PH9 from a starting point S9 toward an ending point G9 shown in FIG. 13. Further, in that example, an infill IF5 of the second slice layer P22 is shaped by the three-dimensional shaping device 1 ejecting the second material along a shaping path PH10 from a starting point S10 toward an ending point G10 shown in FIG. 13. It should be noted that in FIG. 13, each of the shaping path PH9 and the shaping path PH10 is represented by a dotted arrow. Further, in FIG. 13, an area with hatching represents an area where the second material is ejected. In other words, in that example, the filling rate with the infill IF5 is lower than 100%. The device controller 661 arranges, for example, the infill paths adjacent to each other at a predetermined fourth distance from each other in the infill paths for forming the infill IF5. In other words, the device controller 661 arranges, for example, the shaping paths PH10 at the predetermined fourth distance from each other. Thus, it is possible for the three-dimensional shaping device 1 to make the filling rate with the infill IF5 lower than 100%, and as a result, it is possible to decrease the degree of the deformation due to the heat shrinkage of the second slice layer P22. This is because the higher the filling rate with the infill IF5 becomes, the higher the degree of the heat shrinkage of the second slice layer P22, and a tensile stress is generated in the second slice layer P21 in the boundary with the first boundary layer B1 due to the compressive stress in the second slice layer P22 corresponding to a decrease in temperature, which increases the possibility that the second boundary layer B2 separates from the first boundary layer B1 together with the second slice layer P21. As described above, the drive controller 661 in this example gradually raises the filling rate with the infill in the second slice layer every time the shaping proceeds from the second slice layer at a lower side to the second slice layer at an upper side in the shaping of the second portion P2. Therefore, the predetermined fourth distance is a distance shorter than the predetermined third distance. It should be noted that the predetermined fourth distance can be equal to or shorter than the predetermined third distance.

Further, in the example shown in FIG. 13, the longitudinal direction of the infill IF5 is a direction parallel to the longitudinal direction of the infill IF4 in the second slice layer P21, but can also be a direction crossing the longitudinal direction of the infill IF4. The longitudinal direction of the infill IF5 is a direction in which the length of the shaping path PH10 is longer out of the two directions in which the shaping path PH10 extends. When these two longitudinal directions are directions crossing each other, it is possible for the three-dimensional shaping device 1 to enhance the interlayer adhesiveness between the second slice layer P21 and the second slice layer P22.

Further, also in the example shown in FIG. 13, the device controller 661 forms the outline OL5 so that the outline OL2 in the first boundary layer B1 and the outline OL5 in the second slice layer P22 overlap each other when viewing the first boundary layer B1 from the stacking direction of the first portion P1 and the second portion P2. Thus, it is possible for the three-dimensional shaping device 1 to prevent the dimensional accuracy of the three-dimensional shaped article ML1 from decreasing due to a difference between the size of the contour of the first boundary layer B1 and the size of the contour of the second boundary layer B2.

Figure 14:
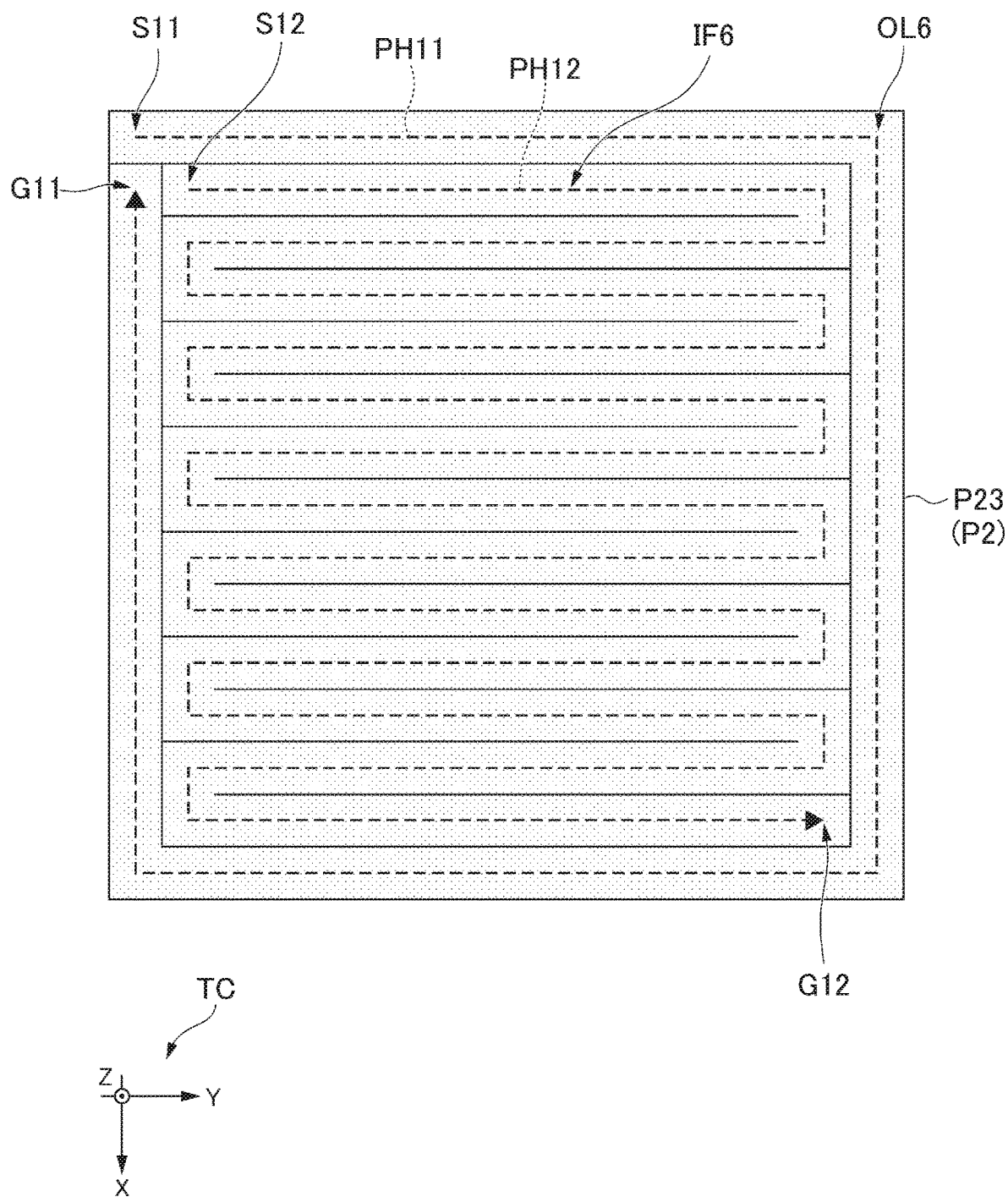
FIG. 14 is a top view showing an example of an appearance of a second slice layer as the uppermost layer out of the three second slice layers stacked on one another as the second portion.

The device controller 661 stacks such a second slice layer P22 on the second slice layer P21, and then stacks the second slice layer P23 shown in FIG. 14 on the second slice layer P22. FIG. 14 is a top view showing an example of an appearance of the second slice layer P23 as the uppermost layer out of the three second slice layers stacked on one another as the second portion P2. In the example shown in FIG. 14, an outline OL6 of the second slice layer P23 is shaped by the three-dimensional shaping device 1 ejecting the second material along a shaping path PH11 from a starting point S11 toward an ending point G11 shown in FIG. 14. Further, in that example, an infill IF6 of the second slice layer P23 is shaped by the three-dimensional shaping device 1 ejecting the second material along a shaping path PH12 from a starting point S12 toward an ending point G12 shown in FIG. 14. It should be noted that in FIG. 14, each of the shaping path PH11 and the shaping path PH12 is represented by a dotted arrow. Further, in FIG. 14, an area with hatching represents an area where the second material is ejected. In other words, in that example, the filling rate with the infill IF6 is 100%. This is because the second slice layer P23 is the slice layer L forming a part of the surface of the three-dimensional shaped article ML1, and is the first solid layer. As described above, the three-dimensional shaping device 1 in this example gradually raises the filling rate with the infill in the second slice layer every time the shaping proceeds from the second slice layer at a lower side to the second slice layer at an upper side in the shaping of the second portion P2.

Further, in the example shown in FIG. 14, the longitudinal direction of the infill IF6 is a direction parallel to the longitudinal direction of the infill IF5 in the second slice layer P22, but can also be a direction crossing the longitudinal direction in which the infill IF5 extends. The longitudinal direction of the infill IF6 is a direction in which the length of the shaping path PH12 is longer out of the two directions in which the shaping path PH12 extends. When these two longitudinal directions are directions crossing each other, it is possible for the three-dimensional shaping device 1 to enhance the interlayer adhesiveness between the second slice layer P22 and the second slice layer P23.

Further, also in the example shown in FIG. 14, the device controller 661 forms the outline OL6 so that the outline OL2 in the first boundary layer B1 and the outline OL6 in the second slice layer P23 overlap each other when viewing the first boundary layer B1 from the stacking direction of the first portion P1 and the second portion P2. Thus, it is possible for the three-dimensional shaping device 1 to prevent the dimensional accuracy of the three-dimensional shaped article ML1 from decreasing due to a difference between the size of the contour of the first boundary layer B1 and the size of the contour of the second boundary layer B2.

When the device controller 661 determines that the shaping of the second portion P2 started in the step S160 is terminated (YES in the step S170), the device controller 661 ends the processing of the flowchart shown in FIG. 4.

As described hereinabove, when the three-dimensional shaping device 1 stacks the second portion P2 formed of the second material on the first portion P1 formed of the first material, the three-dimensional shaping device 1 stacks the first boundary layer B1 formed of the first material on the first portion P1, stacks the second boundary layer B2 formed of the second material on the first boundary layer B1, and stacks the second portion P2 on the second boundary layer B2. Thus, it is possible for the three-dimensional shaping device 1 to prevent the delamination from occurring between the slice layers different in heat shrinkage rate from each other.

It should be noted that in the example described above, there is described when the heat shrinkage rate provided to the second material is higher than the heat shrinkage rate provided to the first material. However, it is possible to adopt a configuration in which the heat shrinkage rate provided to the second material is lower than the heat shrinkage rate provided to the first material. In this case, it is possible for the three-dimensional shaping device 1 to form the first slice layer and the first boundary layer B1 described above from the second material, and form the second boundary layer B2 and the second slice layer from the first material to thereby prevent the delamination from occurring in the boundary between the first portion P1 and the second portion P2.

Further, it is possible for the device controller 661 to have a configuration of identifying one or more boundaries between the first slice layer and the second slice layer based on the three-dimensional shaping data thus retrieved in the step S110 shown in FIG. 4, and then automatically inserting the two boundary layers, namely the first boundary layer and the second boundary layer, in each of the one or more boundaries thus identified. In this case, it is possible for the three-dimensional shaping device 1 to prevent the delamination from occurring between the slice layers different in heat shrinkage rate from each other even when data related to each of the first boundary and the second boundary is not included in the three-dimensional shaping data.

Modified Example 1 of Embodiment

Modified Example 1 of the embodiment will hereinafter be described. In Modified Example 1 of the embodiment, as an example, there will be described when the heat shrinkage rate provided to the second material is higher than the heat shrinkage rate provided to the first material. However, in Modified Example 1 of the embodiment, the first slice layer and the first boundary layer are formed of the second material. Further, in Modified Example 1 of the embodiment, the second slice layer and the second boundary layer are formed of the first material. Further, in Modified Example 1 of the embodiment, the three-dimensional shaping device 1 shapes such a three-dimensional shaped article ML2 as shown in FIG. 15 instead of the three-dimensional shaped article ML1.

Figure 15:
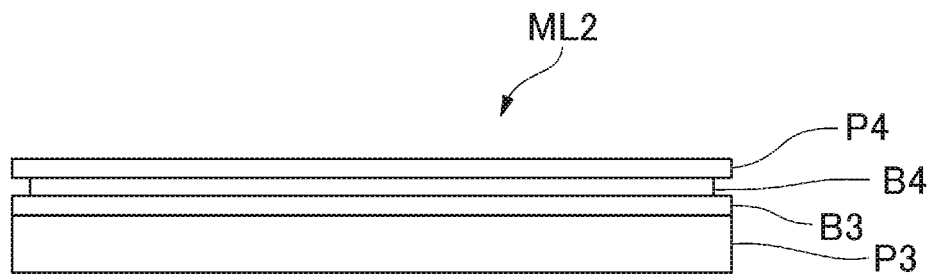
FIG. 15 is a diagram showing an example of an appearance of a three-dimensional shaped article.
Figure 15:
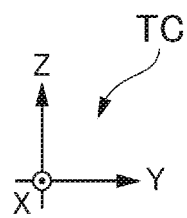

FIG. 15 is a diagram showing an example of an appearance of the three-dimensional shaped article ML2. The three-dimensional shaped article ML2 is a three-dimensional shaped article having a substantially rectangular solid shape obtained by stacking a second portion P4, which is formed of the second slice layer made of the first material so as to have a rectangular shape, on a first portion P3, which is formed of the first slice layer made of the second material so as to have a rectangular shape. The three-dimensional shaped article ML2 is substantially the same component as the three-dimensional shaped article ML1. However, the three-dimensional shaped article ML2 is a three-dimensional shaped article shaped in an upside-down order compared to the order in which the three-dimensional shaped article ML1 is shaped. In other words, the first portion P3 of the three-dimensional shaped article ML2 is a portion corresponding to the second portion P2 of the three-dimensional shaped article ML1. Therefore, the first portion P3 has substantially the same configuration as the configuration of the second portion P2 except the point that the first slice layers corresponding respectively to the second slice layer P21 through the second slice layer P23 are stacked in the order of the first slice layer corresponding to the second slice layer P23, the first slice layer corresponding to the second slice layer P22, and the first slice layer corresponding to the second slice layer P21 beginning at the bottom as the first slice layers made of the second material. Further, the second portion P4 is a portion corresponding to the first portion P1 of the three-dimensional shaped article ML1. Therefore, the second portion P4 has substantially the same configuration as the configuration of the first portion P1 except the point that the second portion P4 is formed of the second slice layers made of the first material. When the three-dimensional shaping device 1 is going to shape the three-dimensional shaped article ML2 obtained by stacking the second portion P4 formed of the first material on the first portion P3 formed of the second material as described above, the three-dimensional shaping device 1 stacks a first boundary layer B3 on the first portion P3, stacks a second boundary layer B4 on the first boundary layer B3, and stacks the second portion P4 on the second boundary layer B4 as shown in FIG. 15. Here, the first boundary layer B3 is a boundary layer having substantially the same configuration as the configuration of the first boundary layer B1 except the point that the first boundary layer B3 is formed of the second material. In contrast, the second boundary layer B4 is a boundary layer having substantially the same configuration as the configuration of the second boundary layer B2 except the point that the second boundary layer B4 is formed of the first material. Thus, it is possible for the three-dimensional shaping device 1 to prevent delamination from occurring in a boundary between the first portion P3 and the second portion P4 formed of the respective materials different in heat shrinkage rate from each other. In other words, it is possible for the three-dimensional shaping device 1 to prevent the delamination from occurring in the boundary between the first portion P3 and the second portion P4 even when the heat shrinkage rate provided to the second material is higher than the heat shrinkage rate provided to the first material, the first portion P3 is formed of the second material, and the second portion P4 is formed of the first material.

It should be noted that the processing of the control device 60 performing the shaping control for shaping the three-dimensional shaped article ML2 is substantially the same processing as the processing of the flowchart shown in FIG. 4. Therefore, the device controller 661 performs shaping of the first portion P3 in the step S120 through the step S130 shown in FIG. 4. It should be noted that the device controller 661 stacks three first slice layers on the shaping surface 21 in the order of the first slice layer corresponding to the second slice layer P23, the first slice layer corresponding to the second slice layer P22, and the first slice layer corresponding to the second slice layer P21 using substantially the same method as the method of forming the second portion P2 and the second material in the step S120 through the step S130. Further, the device controller 661 performs the shaping of the first boundary layer B3 using substantially the same method as the method of forming the first boundary layer B1 and the second material in the step S140 shown in FIG. 4. Further, the device controller 661 performs the shaping of the second boundary layer B4 using substantially the same method as the method of forming the second boundary layer B2 and the first material in the step S150 shown in FIG. 4. Further, the device controller 661 performs the shaping of the second portion P4 using substantially the same method as the method of forming the first portion P1 and the first material in the step S160 through the step S170 shown in FIG. 4. Due to such processing, it is possible for the three-dimensional shaping device 1 to shape the three-dimensional shaped article ML2 to be shaped with materials different in heat shrinkage rate from each other.

It should be noted that in Modified Example 1 of the embodiment, there is described when the heat shrinkage rate provided to the second material is higher than the heat shrinkage rate provided to the first material. However, it is possible to adopt a configuration in which the heat shrinkage rate provided to the second material is lower than the heat shrinkage rate provided to the first material. In this case, it is possible for the three-dimensional shaping device 1 to form the first slice layer and the first boundary layer B3 described above from the first material, and form the second boundary layer B4 and the second slice layer from the second material to thereby prevent the delamination from occurring in the boundary between the first portion P3 and the second portion P4.

Modified Example 2 of Embodiment

Modified Example 2 of the embodiment will hereinafter be described. In Modified Example 2 of the embodiment, as an example, there will be described when the heat shrinkage rate provided to the second material is higher than the heat shrinkage rate provided to the first material. Further, in Modified Example 2 of the embodiment, the three-dimensional shaping device 1 shapes such a three-dimensional shaped article ML3 as shown in FIG. 16 instead of the three-dimensional shaped article ML1.

Figure 16:
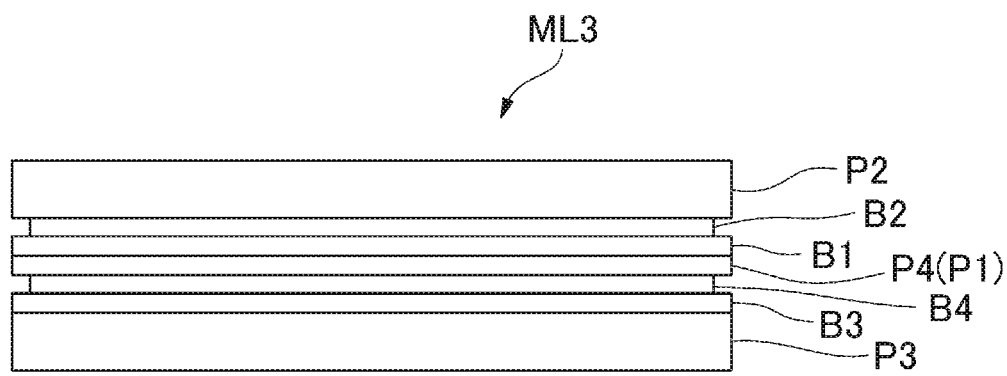
FIG. 16 is a diagram showing an example of an appearance of a three-dimensional shaped article.
Figure 16:
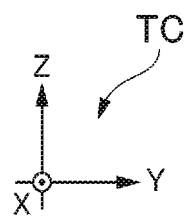

FIG. 16 is a diagram showing an example of an appearance of the three-dimensional shaped article ML3. The three-dimensional shaped article ML3 is such a three-dimensional shaped article as to be obtained by stacking the three-dimensional shaped article ML1 on the three-dimensional shaped article ML2. Specifically, the three-dimensional shaped article ML3 is a three-dimensional shaped article in which both of the upper surface and the lower surface are formed of the slice layers L made of the second material. It should be noted that in the three-dimensional shaped article ML3, the second portion P4 formed of the first material and the first portion P1 formed of the first material are commoditized as a single shaped article. When the three-dimensional shaping device 1 is going to shape the three-dimensional shaped article ML3 in which the second portion P4 is stacked on the first portion P3, and the second portion P2 is stacked on the second portion P4, as shown in FIG. 16, the three-dimensional shaping device 1 stacks the first boundary layer B3 made of the second material on the first portion P3 made of the second material, stacks the second boundary layer B4 made of the first material on the first boundary layer B3 made of the second material, stacks the second portion P4 made of the first material on the second boundary layer B4 made of the first material, stacks the first boundary layer B1 made of the first material on the second portion P4 made of the first material, stacks the second boundary layer B2 made of the second material on the first boundary layer B1 made of the first material, and stacks the second portion P2 made of the second material on the second boundary layer B2 made of the second material. Thus, it is possible for the three-dimensional shaping device 1 to prevent the delamination from occurring in each of the boundary between the first portion P3 and the second portion P4 formed of the respective materials different in heat shrinkage rate from each other, and the boundary between the second portion P4 and the second portion P2 formed of the respective materials different in heat shrinkage rate from each other. As a result, it is possible for the three-dimensional shaping device 1 to shape a three-dimensional shaped article in which, for example, both of the upper and lower surfaces are formed of POM, and a portion between the upper and lower surfaces is formed of ABS as the three-dimensional shaped article ML3.

It should be noted that the processing of the control device 60 performing the shaping control for shaping the three-dimensional shaped article ML3 is processing to which the processing of the flowchart shown in FIG. 4 is applied. For example, the device controller 661 performs the processing in the step S120 through the step S130 shown in FIG. 4 to thereby perform shaping of the first portion P3 using substantially the same method as the method of forming the first portion P3 in Modified Example 2 of the embodiment and the second material. Then, the device controller 661 performs the processing in the step S140 shown in FIG. 4 to thereby perform shaping of the first boundary layer B3 using substantially the same method as the method of forming the first boundary layer B3 in Modified Example 2 of the embodiment and the second material. Then, the device controller 661 performs the processing in the step S150 shown in FIG. 4 to thereby perform shaping of the second boundary layer B4 using substantially the same method as the method of forming the second boundary layer B4 in Modified Example 2 of the embodiment and the first material. Then, the device controller 661 performs the processing in the step S160 through the step S170 shown in FIG. 4 to thereby perform shaping of the second portion P4 using substantially the same method as the method of forming the second portion P4 in Modified Example 2 of the embodiment and the first material. Then, the device controller 661 performs the processing in the step S140 shown in FIG. 4 to thereby perform shaping of the first boundary layer B1 using substantially the same method as the method of forming the first boundary layer B1 in the embodiment and the first material. Then, the device controller 661 performs the processing in the step S150 shown in FIG. 4 to thereby perform shaping of the second boundary layer B2 using substantially the same method as the method of forming the second boundary layer B2 in the embodiment and the second material. Then, the device controller 661 performs the processing in the step S160 through the step S170 shown in FIG. 4 to thereby perform shaping of the second portion P2 using substantially the same method as the method of forming the second portion P2 in Modified Example 2 of the embodiment and the second material. Due to such processing as described hereinabove, it is possible for the three-dimensional shaping device 1 to prevent the delamination from occurring between the slice layers L different in heat shrinkage rate from each other also when shaping the three-dimensional shaped article ML3 shaped using the materials different in heat shrinkage rate from each other.

It should be noted that in Modified Example 2 of the embodiment, there is described when the heat shrinkage rate provided to the second material is higher than the heat shrinkage rate provided to the first material. However, it is possible to adopt a configuration in which the heat shrinkage rate provided to the second material is lower than the heat shrinkage rate provided to the first material.

Modified Example 3 of Embodiment

Modified Example 3 of the embodiment will hereinafter be described. In Modified Example 3 of the embodiment, as an example, there will be described when the heat shrinkage rate provided to the second material is higher than the heat shrinkage rate provided to the first material. Further, in Modified Example 3 of the embodiment, it is possible for the three-dimensional shaping device 1 to have a configuration of shaping such a three-dimensional shaped article ML4 as shown in FIG. 17 instead of the three-dimensional shaped article ML3.

Figure 17:
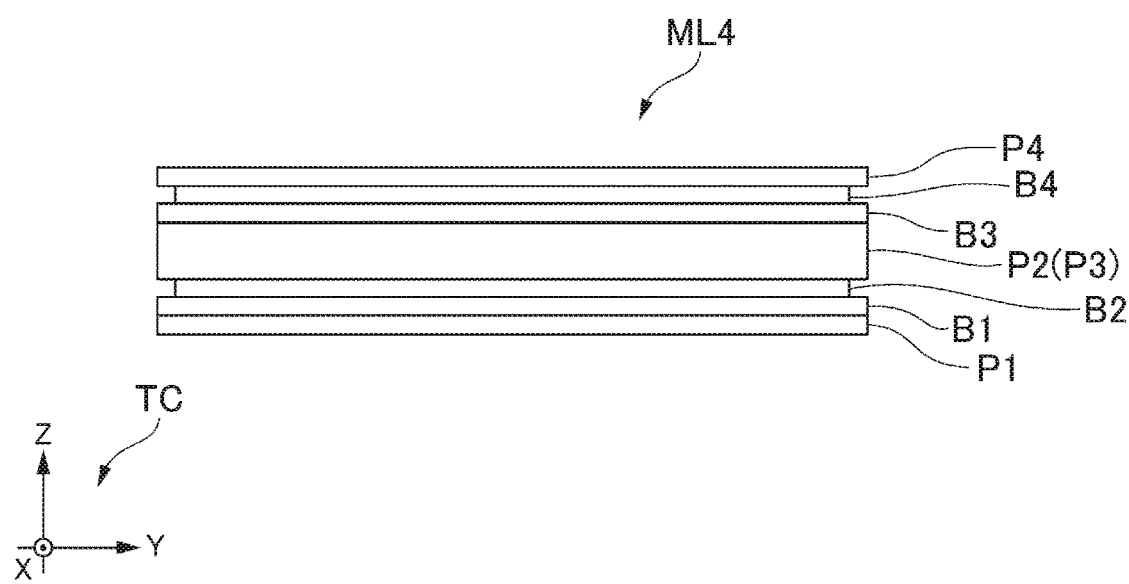
FIG. 17 is a diagram showing an example of an appearance of a three-dimensional shaped article.

FIG. 17 is a diagram showing an example of an appearance of the three-dimensional shaped article ML4. The three-dimensional shaped article ML4 is such a three-dimensional shaped article as to be obtained by stacking the three-dimensional shaped article ML2 on the three-dimensional shaped article ML1. Specifically, the three-dimensional shaped article ML4 is a three-dimensional shaped article in which both of the upper surface and the lower surface are formed of the slice layers L made of the first material. It should be noted that in the three-dimensional shaped article ML4, the second portion P2 formed of the second material and the first portion P3 formed of the second material are commoditized as a single shaped article. When the three-dimensional shaping device 1 is going to shape the three-dimensional shaped article ML4 in which the second portion P2 is stacked on the first portion P1, and the second portion P4 is stacked on the second portion P2, as shown in FIG. 17, the three-dimensional shaping device 1 stacks the first boundary layer B1 made of the first material on the first portion P1 made of the first material, stacks the second boundary layer B2 made of the second material on the first boundary layer B1 made of the first material, stacks the second portion P2 made of the second material on the second boundary layer B2 made of the second material, stacks the first boundary layer B3 made of the first material on the second portion P2 made of the second material, stacks the second boundary layer B4 made of the second material on the first boundary layer B3 made of the first material, and stacks the second portion P4 made of the second material on the second boundary layer B4 made of the second material. Thus, it is possible for the three-dimensional shaping device 1 to prevent the delamination from occurring in each of the boundary between the first portion P1 and the second portion P2 formed of the respective materials different in heat shrinkage rate from each other, and the boundary between the second portion P2 and the second portion P4 formed of the respective materials different in heat shrinkage rate from each other. As a result, it is possible for the three-dimensional shaping device 1 to shape a three-dimensional shaped article in which, for example, both of the upper and lower surfaces are formed of ABS, and a portion between the upper and lower surfaces is formed of POM as the three-dimensional shaped article ML4.

It should be noted that in Modified Example 3 of the embodiment, there is described when the heat shrinkage rate provided to the second material is higher than the heat shrinkage rate provided to the first material. However, it is possible to adopt a configuration in which the heat shrinkage rate provided to the second material is lower than the heat shrinkage rate provided to the first material.

Modified Example 4 of Embodiment

Modified Example 4 of the embodiment will hereinafter be described. In Modified Example 4 of the embodiment, as an example, there will be described when the heat shrinkage rate provided to the second material is higher than the heat shrinkage rate provided to the first material. Further, in Modified Example 4 of the embodiment, it is possible for the three-dimensional shaping device 1 to have a configuration of shaping such a three-dimensional shaped article ML5 as shown in FIG. 18 instead of the three-dimensional shaped article ML4.

Figure 18:
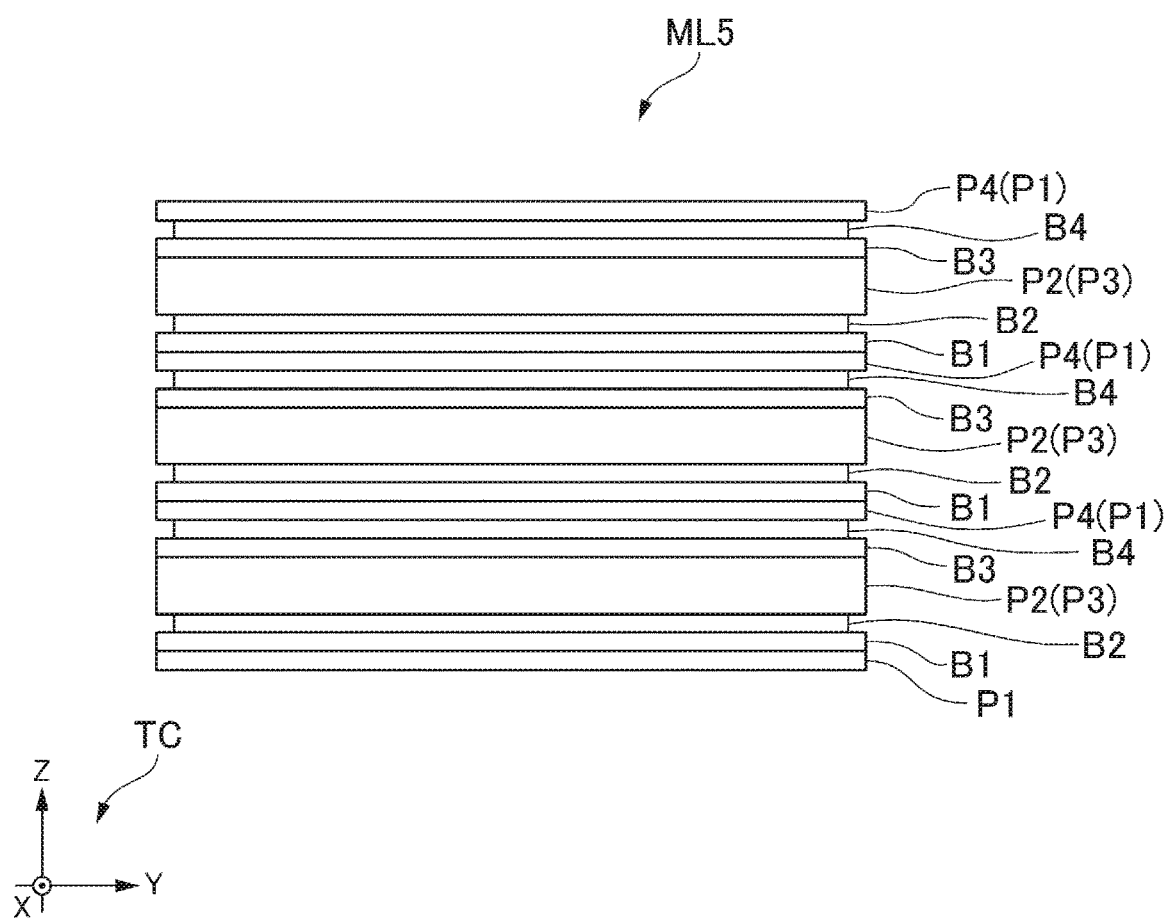
FIG. 18 is a diagram showing an example of an appearance of a three-dimensional shaped article.

FIG. 18 is a diagram showing an example of an appearance of the three-dimensional shaped article ML5. As shown in FIG. 18, the three-dimensional shaped article ML5 is such a three-dimensional shaped article as to be obtained by alternately stacking the three-dimensional shaped articles ML3 and the three-dimensional shaped articles ML4. It is possible for the three-dimensional shaping device 1 to shape the three-dimensional shaped article ML5 by repeatedly performing a combination of the processing of shaping the three-dimensional shaped article ML3 in Modified Example 2 of the embodiment and the processing of shaping the three-dimensional shaped article ML4 in Modified Example 3 of the embodiment. In other words, it is possible for the three-dimensional shaping device 1 to alternately stack the shaped articles formed of the first material and the shaped articles formed of the second material by repeating the combination of the processing to thereby shape the three-dimensional shaped article ML5. As a result, it is possible for the three-dimensional shaping device 1 to artificially shape the three-dimensional shaped article having a desired Young's modulus, desired flexural stiffness, and so on which cannot be realized with a single material. Further, this means that it is possible to create such a three-dimensional shaped article as to be high in flexural stiffness in a certain direction, and low in flexural stiffness in other directions. Further, this means that it is possible to create such a three-dimensional shaped article as to be different in Young's modulus between a certain portion and other portions. Further, these are advantages which can be obtained just because it is possible for the three-dimensional shaping device 1 to prevent the delamination from occurring between the slice layers different in heat shrinkage rate from each other. For example, it is possible for the three-dimensional shaping device 1 to shape the three-dimensional shaped article in which the shaped articles formed of POM and the shaped articles formed of ABS are alternately stacked on one another. Further, the Young's modulus of such a three-dimensional shaped article is different from each of the Young's modulus of the three-dimensional shaped article formed only of ABS, and the Young's modulus of the three-dimensional shaped article formed only of POM.

It should be noted that the contents described above can arbitrarily be combined with each other.

Further, the shape of each of the three-dimensional shaped article ML1 through the three-dimensional shaped article ML5 described above can be any other shapes instead of the substantially rectangular solid shape.

Additional Description

[1] A three-dimensional shaping method of shaping a three-dimensional shaped article using a first material including first resin and a second material including second resin having a heat shrinkage rate different from a heat shrinkage rate which the first resin has, the method including stacking, when preparing a first slice layer formed of one of the first material and the second material, and stacking a second slice layer formed of another of the first material and the second material on the first slice layer, a first boundary layer formed of the one of the first material and the second material on the first slice layer, staking a second boundary layer formed of the another of the first material and the second material on the first boundary layer, and stacking the second slice layer on the second boundary layer, wherein the first boundary layer is a layer provided with a plurality of voids formed inside a contour of the first boundary layer when viewing the first boundary layer from a stacking direction of the first slice layer and the second slice layer.

[2] The three-dimensional shaping method described in [1], wherein the plurality of voids corresponding to a filling rate with an infill inside an outline in the first boundary layer is formed inside the contour of the first boundary layer when viewing the first boundary layer from the stacking direction of the first slice layer and the second slice layer.

[3] The three-dimensional shaping method described in [2], wherein the filling rate with the infill is within a range no lower than 20% and no higher than 90%.

[4] The three-dimensional shaping method described in any one of [1] through [3], wherein the second boundary layer is stacked on the first boundary layer to thereby make a part of the second boundary layer infiltrate into the plurality of voids provided to the first boundary layer.

[5] The three-dimensional shaping method described in any one of [1] through [4], wherein a plurality of the second slice layers is stacked on the second boundary layer, and a supply amount per unit area of the another of the first material and the second material when forming the second boundary layer is more than a supply amount per unit area of the another of the first material and the second material when forming the second slice layers.

[6] The three-dimensional shaping method described in any one of [1] through [5], wherein the filling rate with the infill inside the outline in the second slice layer as a lowermost layer is set to a lowest filling rate out of filling rates with the infill inside the outlines in the respective second slice layers stacked as a plurality of layers on the second boundary layer.

[7] The three-dimensional shaping method described in any one of [1] through [6], wherein a heat shrinkage rate of the second resin is higher than a heat shrinkage rate of the first resin.

[8] The three-dimensional shaping method described in [7], wherein a temperature of the first boundary layer when forming the first boundary layer is made higher than a temperature of the first slice layer when forming the first slice layer.

[9] The three-dimensional shaping method described in any one of [1] through [8], wherein a contour of the second boundary layer is included inside the contour of the first boundary layer when viewing the first boundary layer from the stacking direction of the first slice layer and the second slice layer.

[10] The three-dimensional shaping method described in [9], wherein when forming the second boundary layer, an infill in the second boundary layer is formed after forming an outline in the second boundary layer.

[11] The three-dimensional shaping method described in [10], wherein a temperature of the first boundary layer when forming the outline in the second boundary layer is made higher than a temperature of the first boundary layer when forming the infill in the second boundary layer.

[12] The three-dimensional shaping method described in [9], wherein at least a part of the outline in the first boundary layer overlaps at least a part of the outline in the second slice layer when viewing the first boundary layer from the stacking direction of the first slice layer and the second slice layer.

[13] The three-dimensional shaping method described in [9], wherein a thickness of the second boundary layer is thinner than a thickness of the second slice layer.

[14] A three-dimensional shaping device configured to shape a three-dimensional shaped article using a first material including first resin and a second material including second resin having a heat shrinkage rate different from a heat shrinkage rate which the first resin has, the three-dimensional shaping device including a stage, an ejection unit configured to eject each of the first material and the second material, a moving unit configured to move the ejection unit and the stage relatively to each other, and a controller configured to control the ejection unit and the moving unit, wherein the controller executes stacking, when preparing a first slice layer formed of one of the first material and the second material, and stacking a second slice layer formed of another of the first material and the second material on the first slice layer, a first boundary layer formed of the one of the first material and the second material on the first slice layer, staking a second boundary layer formed of the another of the first material and the second material on the first boundary layer, and stacking the second slice layer on the second boundary layer, wherein the first boundary layer is a layer provided with a plurality of voids formed inside a contour of the first boundary layer when viewing the first boundary layer from a stacking direction of the first slice layer and the second slice layer.

[15] The three-dimensional shaping device described in [14], wherein the plurality of voids corresponding to a filling rate with an infill inside an outline in the first boundary layer is formed inside the contour of the first boundary layer when viewing the first boundary layer from the stacking direction of the first slice layer and the second slice layer.

[16] The three-dimensional shaping device described in [15], wherein the filling rate with the infill is within a range no lower than 20% and no higher than 90%.

[17] The three-dimensional shaping device described in any one of through [16], wherein the second boundary layer is stacked on the first boundary layer to thereby make a part of the second boundary layer infiltrate into the plurality of voids provided to the first boundary layer.

[18] The three-dimensional shaping device described in any one of through [17], wherein a heat shrinkage rate of the second resin is higher than a heat shrinkage rate of the first resin, and a supply amount per unit area of the another of the first material and the second material when forming the second boundary layer is more than a supply amount per unit area of the another of the first material and the second material when forming the second slice layers.

[19] The three-dimensional shaping device described in any one of through [18], wherein the controller decreases relative moving speed between the ejection unit and the stage with the moving unit while keeping a supply rate of the another of the first material and the second material with the ejection unit when forming the second boundary layer.

[20] The three-dimensional shaping device described in any one of through [19], wherein the ejection unit ejects the first material and the second material from a common nozzle.

[21] A control device configured to control a three-dimensional shaping device configured to shape a three-dimensional shaped article using a first material including first resin and a second material including second resin having a heat shrinkage rate different from a heat shrinkage rate which the first resin has, the three-dimensional shaping device including a stage, an ejection unit configured to eject each of the first material and the second material, and a moving unit configured to move the ejection unit and the stage relatively to each other, the control device including a controller configured to control the ejection unit and the moving unit, wherein the controller executes stacking, when preparing a first slice layer formed of one of the first material and the second material, and stacking a second slice layer formed of another of the first material and the second material on the first slice layer, a first boundary layer formed of the one of the first material and the second material on the first slice layer, staking a second boundary layer formed of the another of the first material and the second material on the first boundary layer, and stacking the second slice layer on the second boundary layer, and the first boundary layer is a layer provided with a plurality of voids formed inside a contour of the first boundary layer when viewing the first boundary layer from a stacking direction of the first slice layer and the second slice layer.

[22] A three-dimensional shaping method of shaping a three-dimensional shaped article, the method including stacking a first portion and a second portion on one another, wherein the first portion is formed of a first material including first resin, and has a first Young's modulus, and the second portion is formed of a second material including second resin having a heat shrinkage rate different from a heat shrinkage rate which the first resin has, and has a second Young's modulus different from the first Young's modulus.

Although the embodiment of the present disclosure is hereinabove described in detail with reference to the accompanying drawings, the specific configuration is not limited to the embodiment described above, but modifications, replacement, elimination, and so on are allowed within the scope or the spirit of the present disclosure.

Further, it is also possible to arrange that a program for realizing the function of an arbitrary constituent in the device explained hereinabove is recorded on a computer-readable recording medium, and then the program is retrieved and then executed by a computer system. Here, that device corresponds to, for example, the three-dimensional shaping device 1, the control device 60, or the data generation device 70. It should be noted that the "computer system" mentioned here should include an OS (Operating System) and hardware such as peripheral devices. Further, the "computer-readable recording medium" means a portable medium such as a flexible disk, a magneto-optical disk, a ROM, and a CD (Compact Disk)-ROM, and a storage device such as a hard disk drive incorporated in the computer system. Further, the "computer-readable recording medium" should include those holding a program for a certain period of time such as a volatile memory in a computer system to be a server or a client in the case of transmitting the program via a network such as the Internet, or a communication line such as a telephone line.

Further, the program described above can be transmitted from the computer system having the program stored in the storage device or the like to another computer system via a transmission medium or using a transmission wave in the transmission medium. Here, the "transmission medium" for transmitting the program means a medium having a function of transmitting information like a network such as the Internet or a communication line such as a telephone line.

Further, the program described above can be for realizing a part of the function described above. Further, the program described above can be a program, which can realize the function described above when being combined with a program recorded on the computer system in advance, namely a so-called differential file or a differential program.

What is claimed is:

1. A three-dimensional shaping method of shaping a three-dimensional shaped article using a first material including first resin and a second material including second resin having a heat shrinkage rate different from a heat shrinkage rate which the first resin has, the method comprising:
   stacking, when preparing a first slice layer formed of one of the first material and the second material, and stacking a second slice layer formed of another of the first material and the second material on the first slice layer, a first boundary layer formed of the one of the first material and the second material on the first slice layer;
   stacking a second boundary layer formed of the another of the first material and the second material on the first boundary layer; and
   stacking the second slice layer on the second boundary layer, wherein
   the first boundary layer is a layer provided with a plurality of voids formed inside a contour of the first boundary layer when viewing the first boundary layer from a stacking direction of the first slice layer and the second slice layer.

2. The three-dimensional shaping method according to claim 1, wherein
   the plurality of voids corresponding to a filling rate with an infill inside an outline in the first boundary layer is formed inside the contour of the first boundary layer when viewing the first boundary layer from the stacking direction of the first slice layer and the second slice layer.

3. The three-dimensional shaping method according to claim 2, wherein
   the filling rate with the infill is within a range no lower than 20% and no higher than 90%.

4. The three-dimensional shaping method according to claim 1, wherein
   the second boundary layer is stacked on the first boundary layer to thereby make a part of the second boundary layer infiltrate into the plurality of voids provided to the first boundary layer.

5. The three-dimensional shaping method according to claim 1, wherein
   a plurality of the second slice layers is stacked on the second boundary layer, and
   a supply amount per unit area of the another of the first material and the second material when forming the second boundary layer is more than a supply amount per unit area of the another of the first material and the second material when forming the second slice layers.

6. The three-dimensional shaping method according to claim 1, wherein
   a filling rate with an infill inside an outline in the second slice layer as a lowermost layer is set to a lowest filling rate out of filling rates with the infill inside the outlines in the respective second slice layers stacked as a plurality of layers on the second boundary layer.

7. The three-dimensional shaping method according to claim 1, wherein
a heat shrinkage rate of the second resin is higher than a heat shrinkage rate of the first resin.

8. The three-dimensional shaping method according to claim 7, wherein
a temperature of the first boundary layer when forming the first boundary layer is made higher than a temperature of the first slice layer when forming the first slice layer.

9. The three-dimensional shaping method according to claim 1, wherein
a contour of the second boundary layer is included inside the contour of the first boundary layer when viewing the first boundary layer from the stacking direction of the first slice layer and the second slice layer.

10. A three-dimensional shaping method of shaping a three-dimensional shaped article, the method comprising:
stacking a first portion and a second portion on one another, wherein the first portion is formed of a first material including first resin, and has a first Young's modulus, and the second portion is formed of a second material including second resin having a heat shrinkage rate different from a heat shrinkage rate which the first resin has, and has a second Young's modulus different from the first Young's modulus.

* * * * *